(12) United States Patent
Cassidy et al.

(10) Patent No.: US 11,847,553 B2
(45) Date of Patent: Dec. 19, 2023

(54) PARALLEL COMPUTATIONAL ARCHITECTURE WITH RECONFIGURABLE CORE-LEVEL AND VECTOR-LEVEL PARALLELISM

(71) Applicant: INTERNATIONAL BUSINESS MACHINES CORPORATION, Armonk, NY (US)

(72) Inventors: Andrew S. Cassidy, San Jose, CA (US); Myron D. Flickner, San Jose, CA (US); Pallab Datta, San Jose, CA (US); Hartmut Penner, San Jose, CA (US); Rathinakumar Appuswamy, San Jose, CA (US); Jun Sawada, Austin, TX (US); John V. Arthur, Mountain View, CA (US); Dharmendra S. Modha, San Jose, CA (US); Steven K. Esser, San Jose, CA (US); Brian Taba, Cupertino, CA (US); Jennifer Klamo, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1180 days.

(21) Appl. No.: 16/008,949

(22) Filed: Jun. 14, 2018

(65) Prior Publication Data
US 2019/0385046 A1 Dec. 19, 2019

(51) Int. Cl.
*G06N 3/063* (2023.01)
*G06N 3/04* (2023.01)
*G06F 15/80* (2006.01)

(52) U.S. Cl.
CPC ......... *G06N 3/063* (2013.01); *G06F 15/8092* (2013.01); *G06N 3/04* (2013.01)

(58) Field of Classification Search
CPC ....... G06N 3/063; G06N 3/04; G06F 15/8092
See application file for complete search history.

(56) References Cited

U.S. PATENT DOCUMENTS

| 5,784,636 A | 7/1998 | Rupp |
| 8,090,928 B2 | 1/2012 | Schmidt et al. |

(Continued)

FOREIGN PATENT DOCUMENTS

| CN | 106815636 A | 6/2017 |
| CN | 107301456 A | 10/2017 |

(Continued)

OTHER PUBLICATIONS

Lu, Liqiang, et al. "Evaluating fast algorithms for convolutional neural networks on FPGAs." 2017 IEEE 25th annual international symposium on field-programmable custom computing machines (FCCM). IEEE, 2017. (Year: 2017).*

(Continued)

*Primary Examiner* — Ying Yu Chen
*Assistant Examiner* — Sidney Vincent Bostwick
(74) *Attorney, Agent, or Firm* — Erik A. Huestis; Stephen J. Kenny; Foley Hoag LLP

(57) ABSTRACT

Neural network processing hardware using parallel computational architectures with reconfigurable core-level and vector-level parallelism is provided. In various embodiments, a neural network model memory is adapted to store a neural network model comprising a plurality of layers. Each layer has at least one dimension and comprises a plurality of synaptic weights. A plurality of neural cores is provided. Each neural core includes a computation unit and an activation memory. The computation unit is adapted to apply a plurality of synaptic weights to a plurality of input activations to produce a plurality of output activations. The computation unit has a plurality of vector units. The acti- (Continued)

Core Parallelism: 16
Vector Parallelism: 2 vation memory is adapted to store the input activations and the output activations. The system is adapted to partition the plurality of cores into a plurality of partitions based on dimensions of the layer and the vector units.

24 Claims, 24 Drawing Sheets

(56) References Cited

U.S. PATENT DOCUMENTS

| | | | |
|---|---|---|---|
| 8,156,284 | B2 | 4/2012 | Vorbach et al. |
| 8,914,590 | B2 | 12/2014 | Vorbach et al. |
| 2017/0169326 | A1 | 6/2017 | Diamos et al. |
| 2017/0316312 | A1* | 11/2017 | Goyal ............... G06N 3/0454 |
| 2018/0018554 | A1* | 1/2018 | Young ............... G06N 3/02 |
| 2018/0046906 | A1* | 2/2018 | Dally ............... G06N 3/04 |
| 2018/0189642 | A1* | 7/2018 | Boesch ............... G06N 20/00 |
| 2019/0180170 | A1* | 6/2019 | Huang ............... G06F 15/80 |

FOREIGN PATENT DOCUMENTS

| | | |
|---|---|---|
| JP | H 2306365 A | 12/1990 |
| JP | H 3100755 A | 4/1991 |
| JP | 2000/322400 A | 11/2000 |

OTHER PUBLICATIONS

Luo, Yuan, et al. "Architecture and implementation of a vector MAC unit for complex number." 9th International Conference on Communications and Networking in China. IEEE, 2014. (Year: 2014).*
Prabhaker, R. et al, "Plasticine: A Reconfigurable Architecture for Parallel Patterns." (2017).
Ostadzadeh, S. et al. "Parallelism Utilization in Embedded Reconfigurable Computing Systems: A Survey of Recent Trends."
"Instruction-Set Extendible GPU," Jan. 12, 2017.
"Reconfigurable Communication Network with Distributed Control," Dec. 22, 2014.
Rapp, J. and Fuster, J. "Dynamically Configured Hardware Accelerator Functions," (Jun. 4, 2008).
Examination Report for GB Application No. 2017726.7 dated Mar. 29, 2021.
International Search Report and Written Opinion for International Application No. PCT/IB2019/054669 dated Sep. 24, 2019.
Examination Report for GB Application No. 2017726.7 dated Jan. 7, 2021.
Notice of Reasons for Refusal Translation for JP Application No. 2020-557195 dated Oct. 21, 2022.

* cited by examiner

100

Core Parallelism: 8
Vector Parallelism: 4

100

Core Parallelism: 4
Vector Parallelism: 8

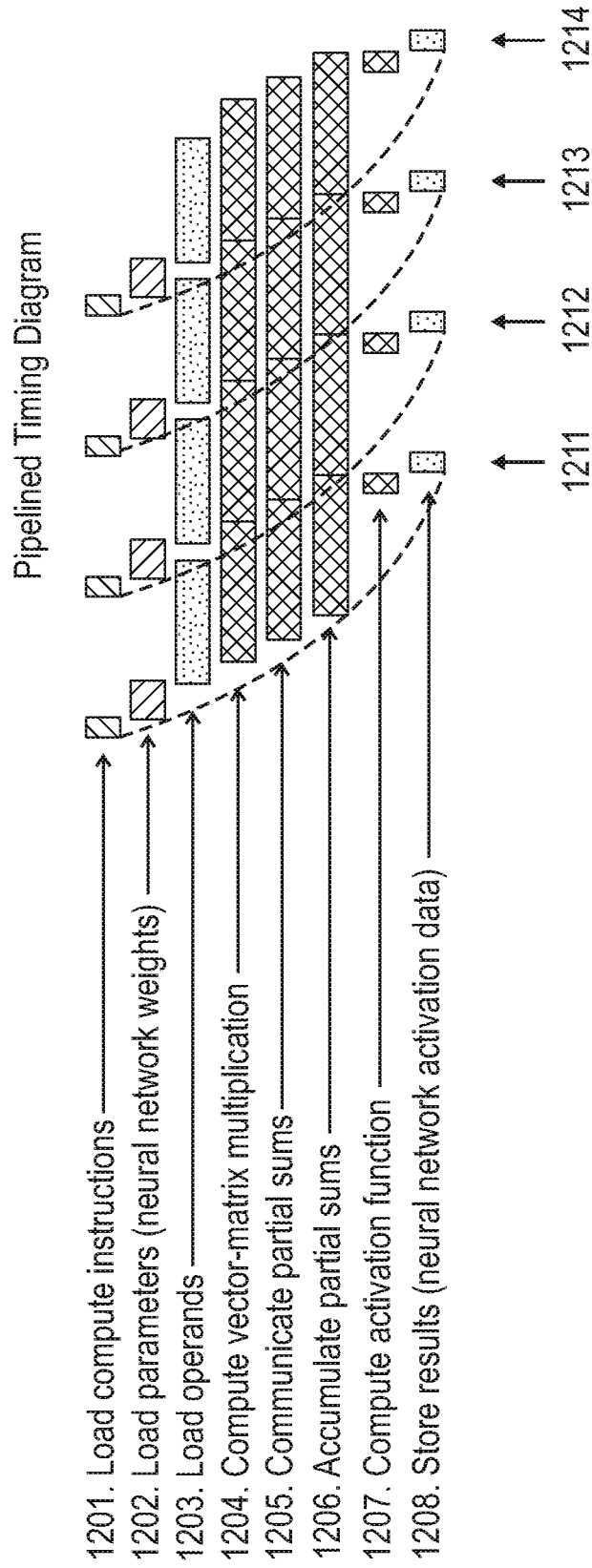

PARALLEL COMPUTATIONAL ARCHITECTURE WITH RECONFIGURABLE CORE-LEVEL AND VECTOR-LEVEL PARALLELISM

BACKGROUND

Embodiments of the present disclosure relate to neural network processing hardware, and more specifically, to parallel computational architectures with reconfigurable core-level and vector-level parallelism.

BRIEF SUMMARY

According to various embodiments of the present disclosure, parallel computational architectures are provided. A neural network model memory is adapted to store a neural network model comprising a plurality of layers. Each layer has at least one dimension and comprises a plurality of synaptic weights. A plurality of neural cores is provided. Each neural core includes a computation unit and an activation memory. The computation unit is adapted to apply a plurality of synaptic weights to a plurality of input activations to produce a plurality of output activations. The computation unit has a plurality of vector units. The activation memory is adapted to store the input activations and the output activations. The system is adapted to partition the plurality of cores into a plurality of partitions based on dimensions of the layer and the vector units.

According to embodiments of the present disclosure, methods of and computer program products for configuring an Inference Processing Unit (IPU) are provided. A neural network model comprising a plurality of layers is read. Each layer has at least one dimension and comprises a plurality of synaptic weights. For each layer of the neural network model: a plurality of cores is partitioned into a plurality of partitions based on dimensions of the layer and vector units; the plurality of cores is configured to implement the layer; input activations for the layer are provided to the plurality of cores; and the synaptic weights associated with the layer are applied to the input activations to produce a plurality of output activations.

BRIEF DESCRIPTION OF THE SEVERAL VIEWS OF THE DRAWINGS

FIG. 12 is a pipelined timing diagram, illustrating core operation according to embodiments of the present disclosure.

DETAILED DESCRIPTION

Figure 1A:
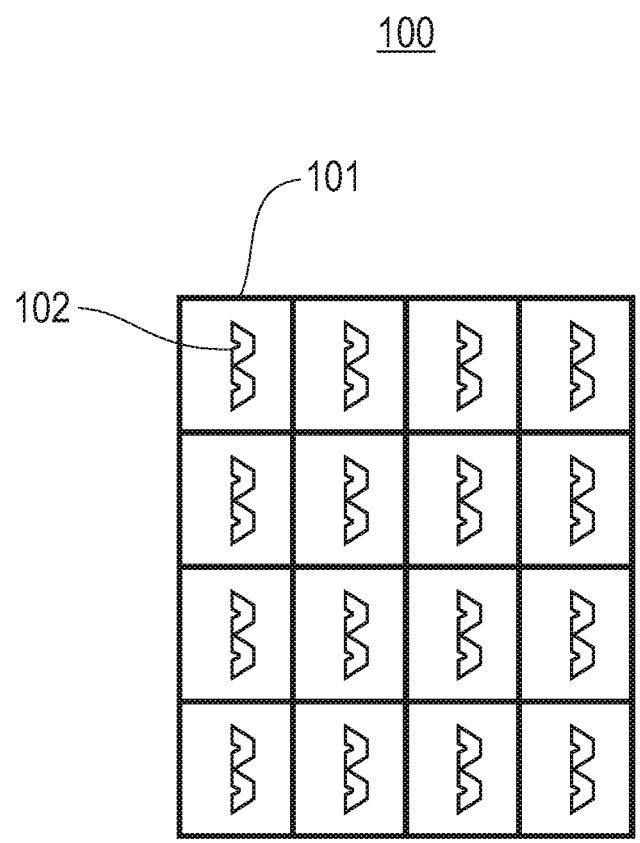
FIG. 1A-D illustrates exemplary parallel configurations of a given network on a single multi-core processor.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions σ in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function σ.

An element of a layer's output data tensor Y can be computed as in Equation 1 where the neuron activation function σ is configured by the vector of activation function parameters V [i,j,k,:], and the weighted sum Z[i,j,k] can be computed as in Equation 2.

$$Y[i, j, k] = \sigma(V[i, j, k, :]; Z[i, j, k]) \quad \text{Equation 1}$$

$$Z[i, j, k] = \sum_{a=1}^{A} \sum_{b=1}^{B} \sum_{c=1}^{C} W[i, j, k, a, b, c] \cdot X[a, b, c] \quad \text{Equation 2}$$

For simplicity of notation, the weighted sum in Equation 2 may be referred to as the output, which is equivalent to using a linear activation function Y[i,j,k]=σ(Z[i,j,k])=Z[i,j,k], with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

As noted above, massively parallel computational architectures have the potential to massively speedup execution over traditional sequential computational architectures. However, the actual speedup is limited by the parallelism present in the actual data and algorithm, as well as the efficiency of the mapping of the data and algorithm to the parallel architecture. Neural networks are generally amenable to parallelism—there is abundant parallelism in both the activation and weight data along many dimensions, including spatial and feature dimensions. However, the degree of parallelism, and the most efficient type of parallelism changes depending on the individual network, as well as within a given network. For example, from layer to layer there may be different dimensions. Accordingly, parallel architectures with fixed sizes (e.g., fixed array sizes, fixed vector widths, fixed numbers of parallel compute units) and configurations have difficulty making use of all available parallelism in the data and/or algorithm.

To illustrate the variation of network dimensions, Table 1 includes the layer dimensions (height×width×features) of various exemplary networks. Despite having input layers and last layers with the same dimension (as they are solving the same classification problem on the same dataset), there is a wide variance of network layer sizes between implementations (and not all layers are shown). It will be appreciated that, within a network, layer shape changes from first layer to the last layer. The early layers generally have large spatial dimensions (height, width), while the later layers have large feature dimensions.

TABLE 1

|  | Inception v1 | AlexNet | VGG-19 | ResNet |
| --- | --- | --- | --- | --- |
| Input layer | 224 × 224 × 3 | 224 × 224 × 3 | 224 × 224 × 3 | 224 × 224 × 3 |
| First layer | 112 × 112 × 64 | 55 × 55 × 48 | 224 × 224 × 64 | 112 × 112 × 64 |
| Intermediate layer | 14 × 14 × 512 | 13 × 13 × 256 | 28 × 28 × 512 | 14 × 14 × 256 |
| Late layer | 7 × 7 × 1024 | 6 × 6 × 256 | 7 × 7 × 512 | 7 × 7 × 512 |
| Last layer | 1 × 1 × 1000 | 1 × 1 × 1000 | 1 × 1 × 1000 | 1 × 1 × 1000 |

Figure 1B:
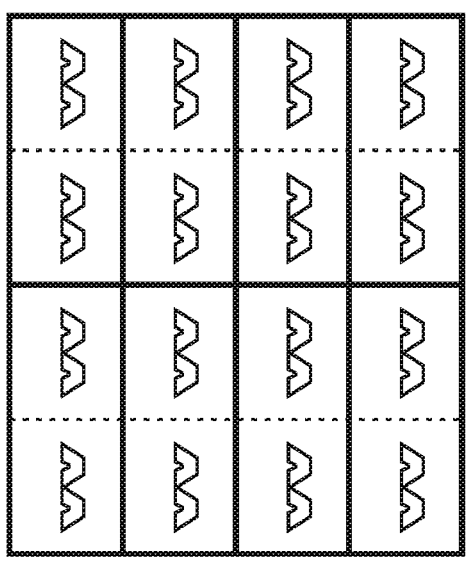
Figure 1C:
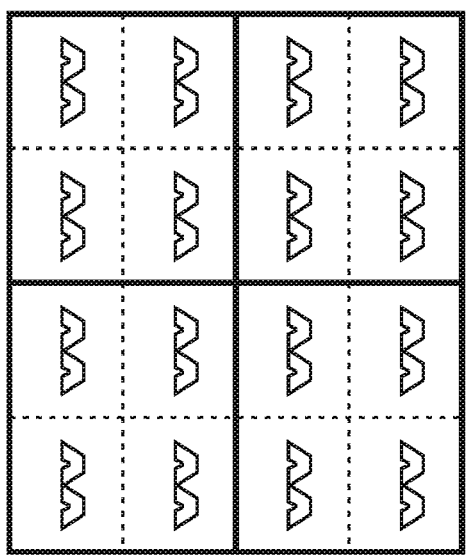
Figure 1D:
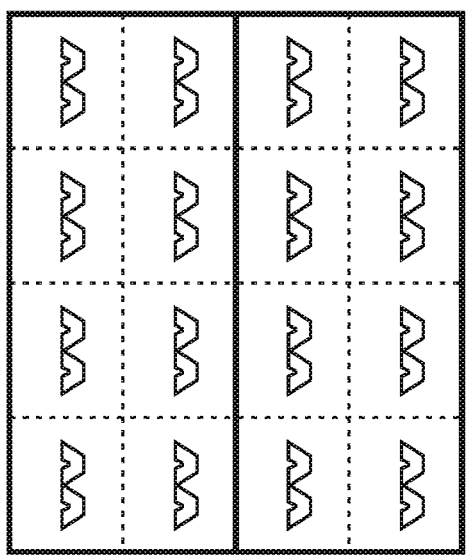

Referring to FIG. 1A-D, exemplary parallel configurations of a given network on a single multi-core processor are illustrated. In FIG. 1A, processor 100 is configured with core parallelism of 16, meaning that each of 16 cores (e.g., 101) is executing in parallel. Vector parallelism is 2, meaning that each core processes 2 input vectors (e.g., 102) in parallel. In FIG. 1B, processor 100 is configured with core parallelism of 8 and vector parallelism is 4. In FIG. 1C, processor 100 is configured with core parallelism of 4 and vector parallelism is 8. In FIG. 1D, processor 100 is configured with core parallelism of 2 and vector parallelism is 16. The present disclosure enables such configurations by addressing how to coherently partition and allocate data across the cores, how to make arithmetic vector units with different effective vector widths, how to coherently send data to vector units of different widths, and how to reconfigure the processor into different modes.

Figure 2A:
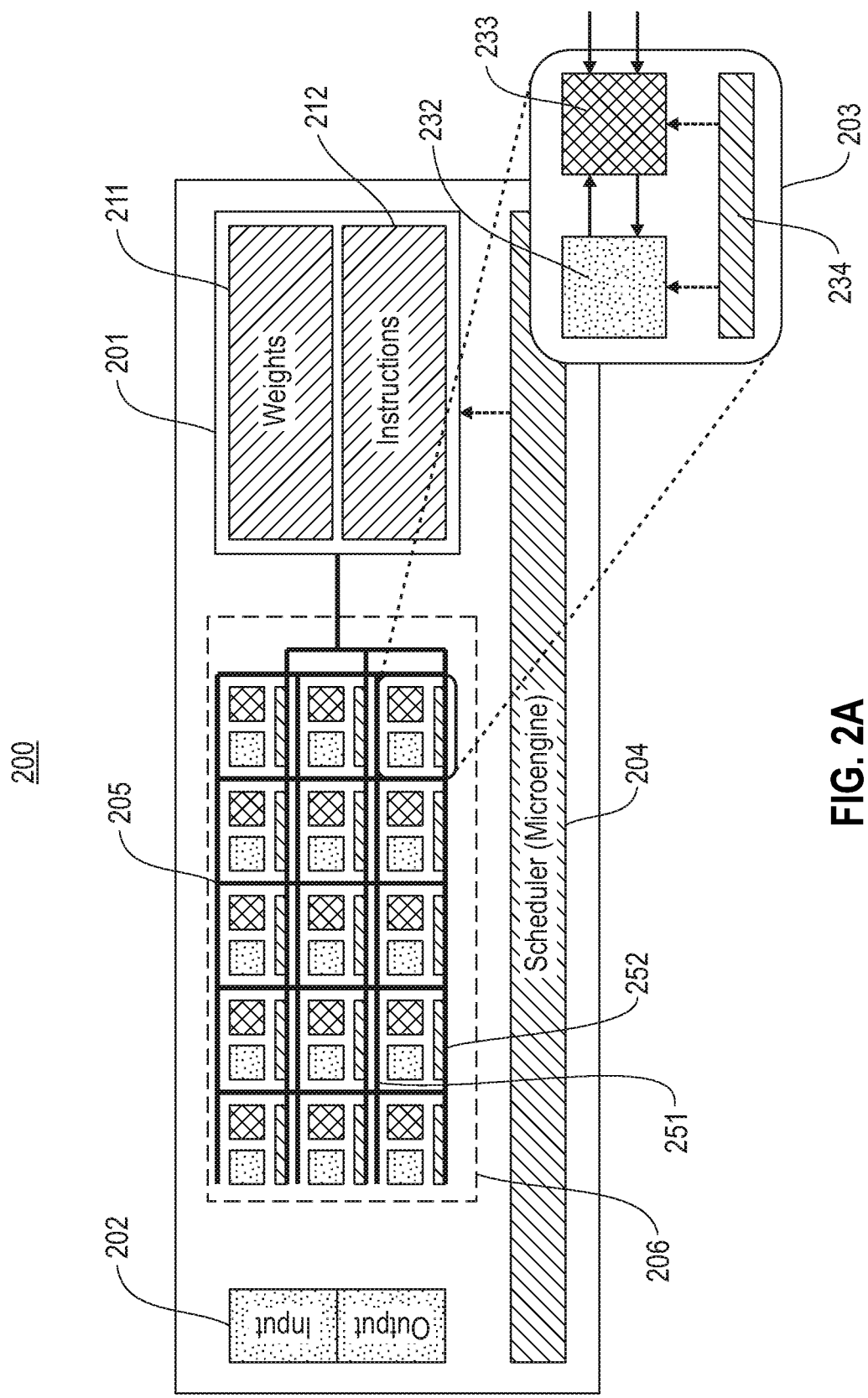
FIG. 2A illustrates a multi-core Inference Processing Unit (IPU) according to embodiments of the present disclosure.

Referring to FIG. 2A, a multi-core Inference Processing Unit (IPU) is illustrated according to embodiments of the present disclosure. IPU 200 includes a model memory 201 for the neural network model. As described above, the neural network model may include the synapse weights for a neural network to be computed. In some embodiments, model memory 201 includes one or more physical memories, which may be allocated separately to synaptic weights 211 and instructions 212. IPU 200 includes an activation memory 202, which may be transient. Activation memory 202 may be divided into input and output regions, and stores neuron activations for processing.

IPU 200 includes an array 206 of neural cores 203. Each core 203 includes a computation unit 233, which is loaded with a neural network model from model memory 201 and is operative to perform vector computation. Each core also includes a local activation memory 232. Input activations are provided from local activation memory 232 in advance of each computation step. Outputs from computation unit 233 are written back to activation memory 232 for processing on the same or another computation unit.

IPU 200 includes one or more network-on-chip (NoC) 205. In some embodiments, a partial sum NoC 251 interconnects the cores 203 and transports partial sums among them. In some embodiments, a separate parameter distribution NoC 252 connects cores 203 to memory 201 for distributing weights and instructions to cores 203. It will be appreciated that various configurations of NoC 251 and 252 are suitable for use according to the present disclosure. For example, broadcast networks, row broadcast networks, tree networks, and switched networks may be used.

In various embodiments a global scheduler (chip microengine) 204 is included in IPU 200. In various embodiments, a local core controller (core microengine) 234 is included on each core 203. In such embodiments, the direction of operations is shared between the global scheduler (chip microengine) and the local core controller (core microengine). For example, compute instructions may be loaded from model memory 201 to the computation unit 233 on each core 203 by global scheduler 204. Parameters (e.g., neural network/synaptic weights) may be loaded from model memory 201 to the computation unit 233 on each core 203 by global scheduler 204. Neural network activation data may be loaded from local activation memory 232 to computation unit 233 on each core 203 by local core controller 234. As noted above, the activations are provided to the axons of the particular neural network defined by the model, and may originate from the same or another computation unit, or from outside the system.

Computation unit 233 performs the computation to generate output neuron activations as directed by local core controller 234. In particular, the computation comprises applying the input synaptic weights to the input activations. It will be appreciated that various methods are available for performing such computations, including in silico dendrites, as well as vector multiplication units. The results from computation are stored in local activation memory 232 as directed by local core controller 234. These stages may be pipelined, in order to provide efficient usage of the computation unit on each core. It will also be appreciated that inputs and outputs may be transferred from local activation memory 232 to global activation memory 202 according to the requirements of a given neural network.

Figure 2B:
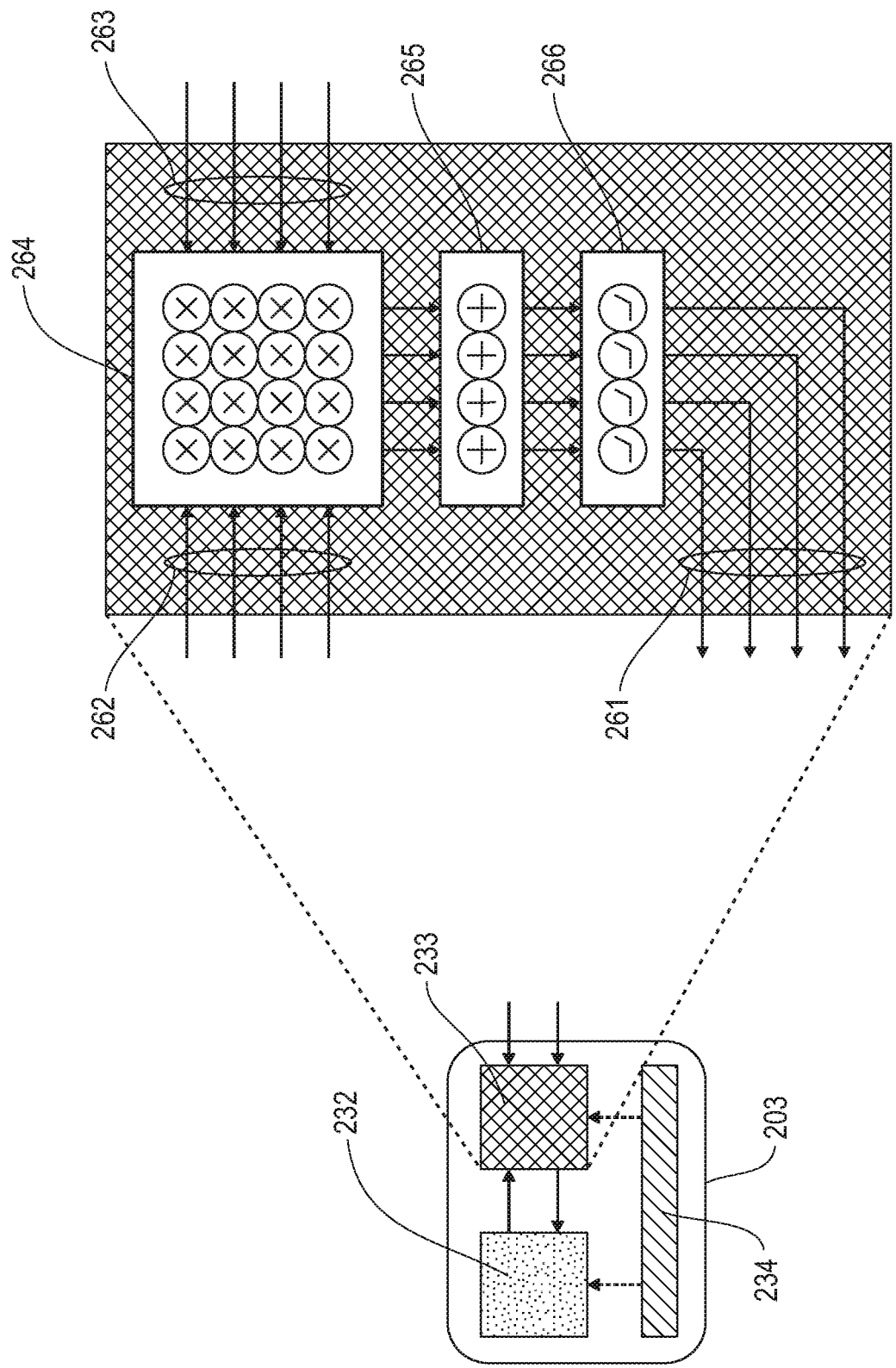
FIG. 2B illustrates the core computational elements within the core of an Inference Processing Unit (IPU) according to embodiments of the present disclosure.

Referring to FIG. 2B, to compute an 1×M output tensor block 261, a neural core multiplies an 1×N input activation block 262 with an N×M weight block 263. Vector-Matrix multiply unit 264 performs the multiplication and passes the resulting products to 1×N vector arithmetic unit 265. In turn, the results of arithmetic 265 are provided to M neuron activation functions 266 to produce 1×M output tensor block 261.

For purposes of illustration, IPU 200 may include an array of A×B parallel cores, each with N×M parallel vector or matrix computation elements.

Each core computes a vector matrix multiplication $Z=XW$ where: X is an input data row vector [1×N]; W is a weight matrix [N×M]; and Z is an output data row vector [1×M]. Each core applies an activation function $Y=f(Z)$ to the output of the matrix multiplication, where Y is an output data row vector [1×M] and $f(\cdot)$ is a linear or non-linear function. This makes up a single neuron operation. For neural network inference, this operation is repeated over many neurons and many layers of neurons, each operating on different data X and potentially different parameters W.

As set out further herein, the present disclosure provides for parallel utilization of such cores. In particular, both core and vector parallelism is provided. In general, data-level or thread-level parallelism is accommodated by spreading over cores, while operation-level parallelism is accommodated by spreading over vector units. The present disclosure enables maximizing this mapping, such that at any given time nearly all of the cores are computing (non-idle), and nearly all of the vector units are computing (non-idle).

In an exemplary configuration, neural inference data parallelism is provided across spatial and feature dimensions. Data parallelism may be mapped to the architectural parallelism as follows: spatial parallelism is provided by spreading over cores while feature parallelism is provided by spreading over vector units.

In various embodiments, a parallel computing architecture is provided wherein core-level parallelism and vector-level parallelism are reconfigurable. In particular, the computing architecture may be applied to neural network inference. Various examples are phrased in terms of vector-level parallelism. However, it will be appreciated that the disclosure provided herein is applicable to matrix-level parallelism, or more generally operation-level parallelism involving parallel arithmetic and/or logical compute units.

As set out herein, different sized tensors (having different spatial and feature dimensions) are mapped to the same core array while maintaining efficient utilization of the core array and core compute elements. Data are partitioned across cores at configurable granularity (corresponding to the core-level parallelism). In various configurations, the data spatial parallelism maps to core parallelism and the data feature parallelism maps to vector parallelism. Such configurations may be particularly suitable for early layers in a network. In some configurations, spatial parallelism and feature parallelism map to core parallelism and feature parallelism maps to vector parallelism. Such configurations may be particularly suitable for later layers in a network. In various embodiments, a NoC is used to distribute the data across the cores.

As summarized below in Table 2, different parallelization strategies are available depending on the relationships between spatial and core parallelism and feature and vector parallelism. In typical early layers, feature parallelism is less than or equal to vector parallelism and spatial parallelism is greater than core parallelism. In typical middle layers, feature parallelism is greater than or equal to vector parallelism and spatial parallelism is greater than or equal to core parallelism. In typical later layers, feature parallelism is greater than vector parallelism and spatial parallelism is less than core parallelism. It will be appreciated that in cases where feature parallelism equals vector parallelism and spatial parallelism equals core parallelism, there exists a native 1:1 mapping from a given tensor to a given physical core array.

TABLE 2

|  | Feature parallelism > Vector parallelism | Feature parallelism = Vector parallelism | Feature parallelism < Vector parallelism |
|---|---|---|---|
| Spatial parallelism > Core parallelism | Each core operates individually | Each core operates individually | Subdivide cores; Increase effective # of cores (spatial parallelism) |
| Spatial parallelism = Core parallelism | Each core operates individually | Native 1:1 mapping; Each core operates individually | Each core operates individually; Effective Efficiency = F/V |
| Spatial parallelism < Core parallelism | Combine multiple cores; Increase effective vector parallelism | Each core operates individually; Effective Efficiency = S/C | Each core operates individually; Effective Efficiency = S/C × F/V |

Figure 3:
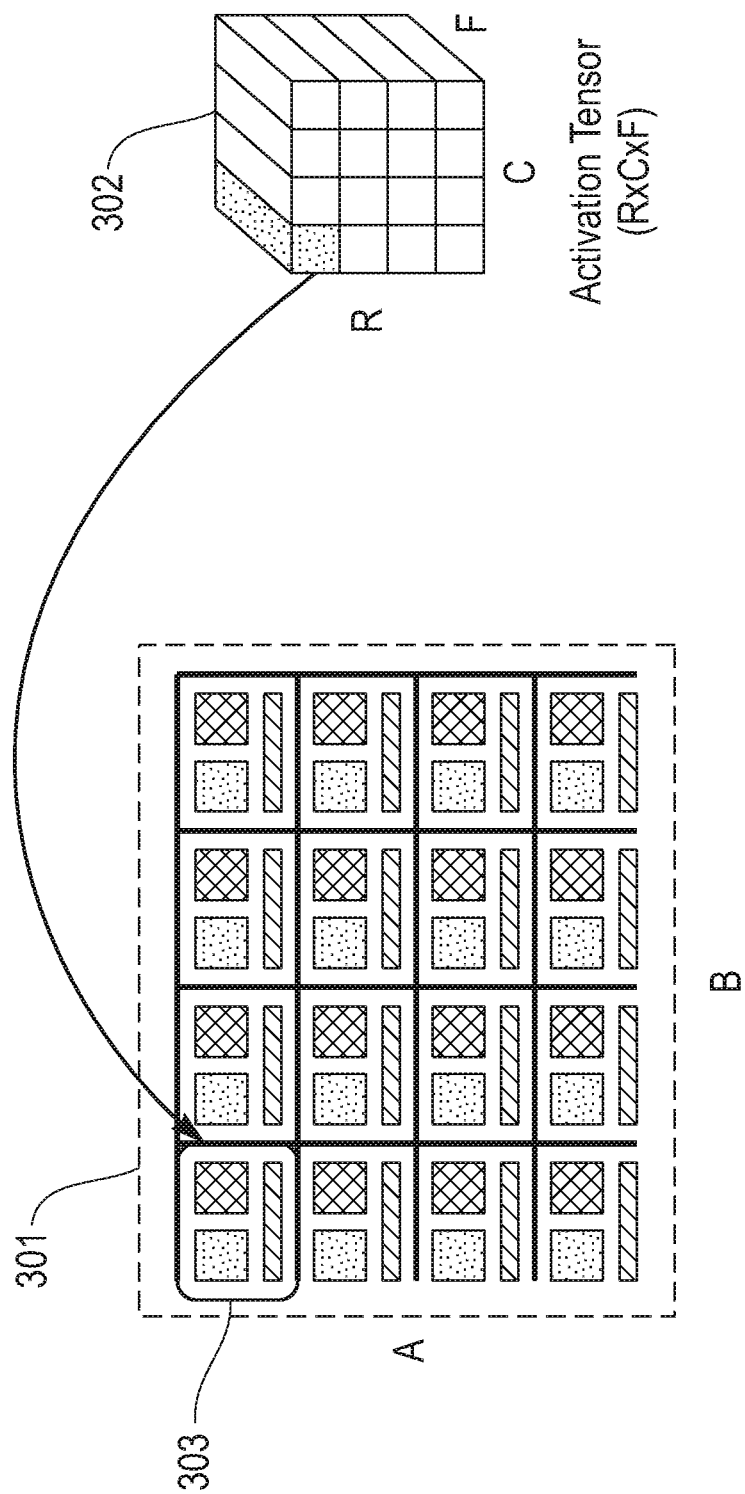
FIG. 3 illustrates an exemplary tensor mapping according to embodiments of the present disclosure.

Referring to FIG. 3, an exemplary tensor mapping is illustrated according to embodiments of the present disclosure. A parallel core array 301 includes A×B=16 parallel cores, each having vector parallelism of N≥1. Activation tensor 302 has spatial parallelism R×C=16, and feature parallelism of F=N. Accordingly, A=R, B=C, and N=F. Core array 301 may be partitioned into 16 islands 303, each including one core. A×1×1×1 spatial slice of the activation tensor may then be mapped to each island.

Figure 4:
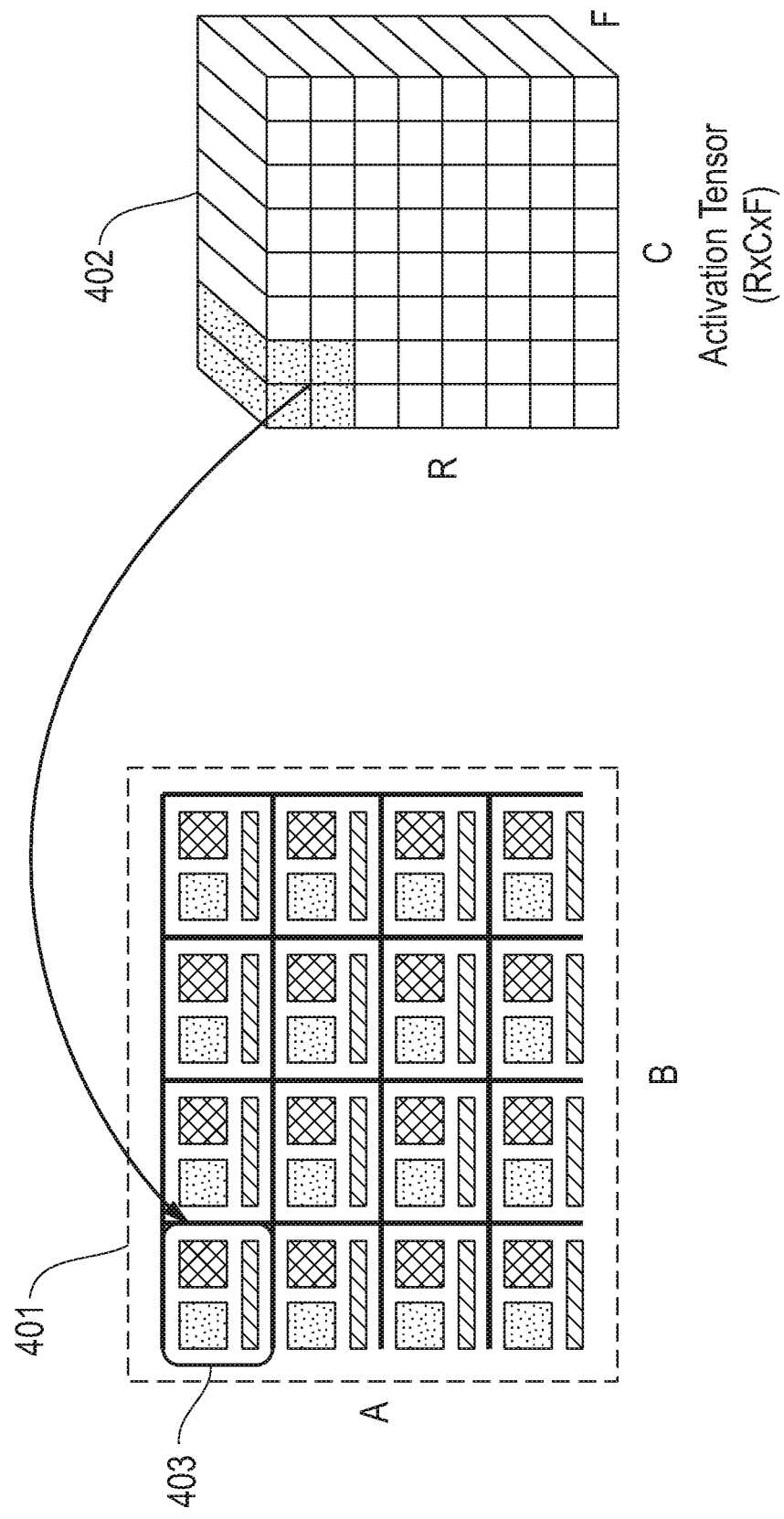
FIG. 4 illustrates another exemplary tensor mapping according to embodiments of the present disclosure.

Referring to FIG. 4, another exemplary tensor mapping is illustrated according to embodiments of the present disclosure. A parallel core array 401 includes A×B=16 parallel cores, each having vector parallelism of N. Activation tensor 402 has spatial parallelism R×C=64, and feature parallelism of F=N. Accordingly, A<R, B<C, and N=F. Core array 401 may be partitioned into 16 islands 403, each including one core. A 2×2×1 spatial slice of the activation tensor may then be mapped to each island.

Figure 5:
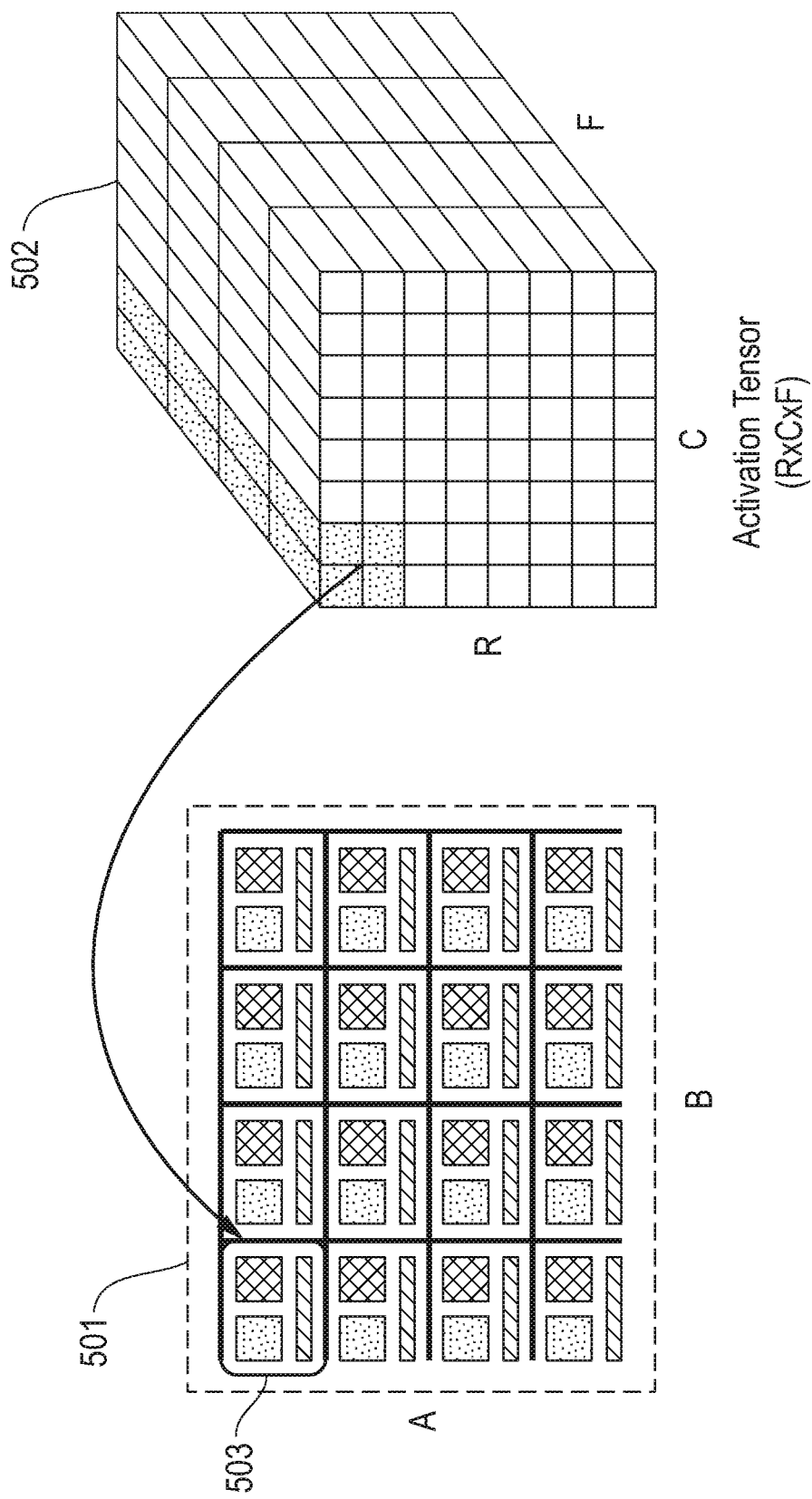
FIG. 5 illustrates another exemplary tensor mapping according to embodiments of the present disclosure.

Referring to FIG. 5, another exemplary tensor mapping is illustrated according to embodiments of the present disclosure. A parallel core array 501 includes A×B=16 parallel cores, each having vector parallelism of N. Activation tensor 502 has spatial parallelism R×C=64, and feature parallelism of F=4N. Accordingly, A<R, B<C, and N<F. Core array 501 may be partitioned into 16 islands 503, each including one core. A 2×2×4N slice of the activation tensor may then be mapped to each island.

Figure 6:
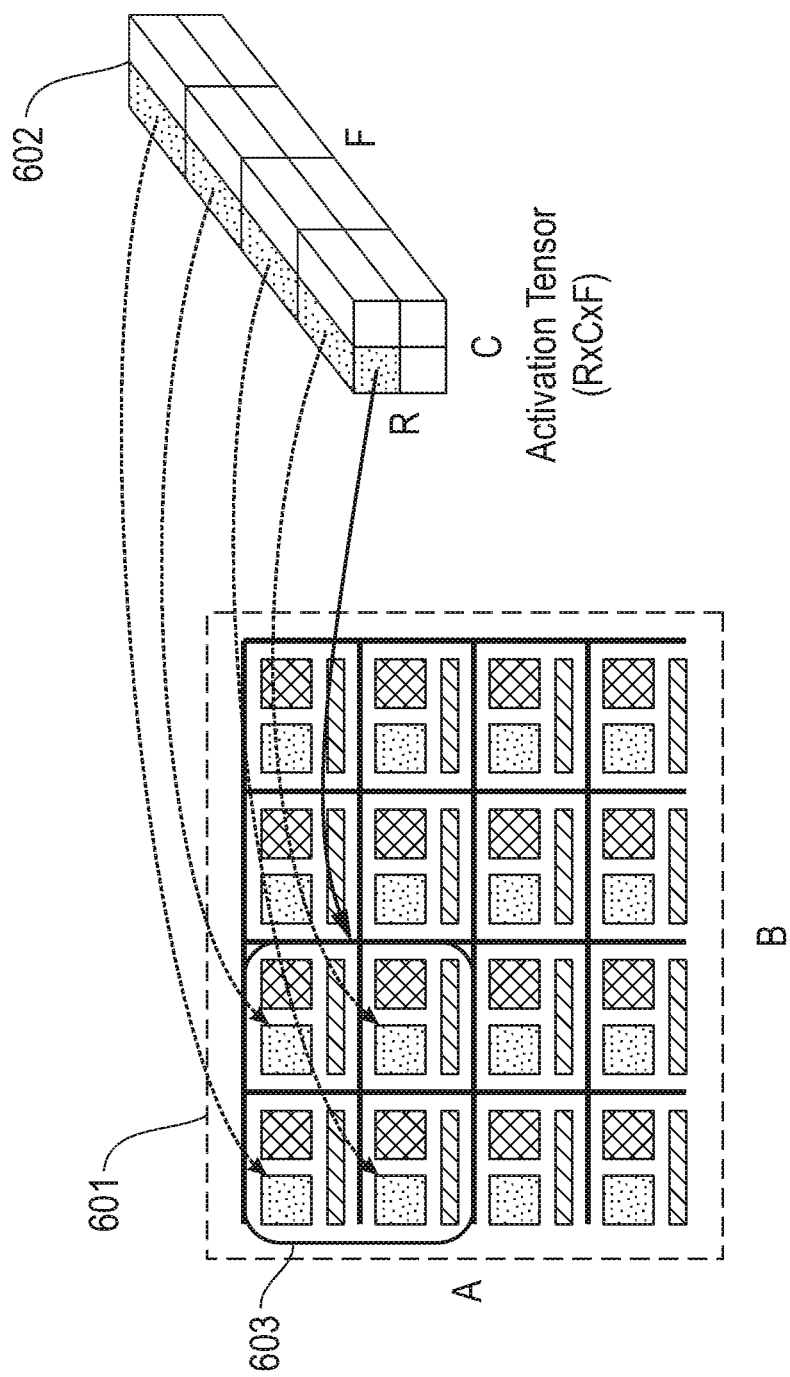
FIG. 6 illustrates another exemplary tensor mapping according to embodiments of the present disclosure.

Referring to FIG. 6, another exemplary tensor mapping is illustrated according to embodiments of the present disclosure. A parallel core array 601 includes A×B=16 parallel cores, each having vector parallelism of N. Activation tensor 602 has spatial dimensions R×C=4, and feature parallelism of F=4N. Accordingly, A>R, B>C, and N<F. Core array 601 may be partitioned into 4 islands 603, each including four cores. In this example, the islands are square within the array of cores. A 1×1×4N slice of the activation tensor may then be mapped to each island, each core in the island receiving a 1×1×N subslice.

Figure 7:
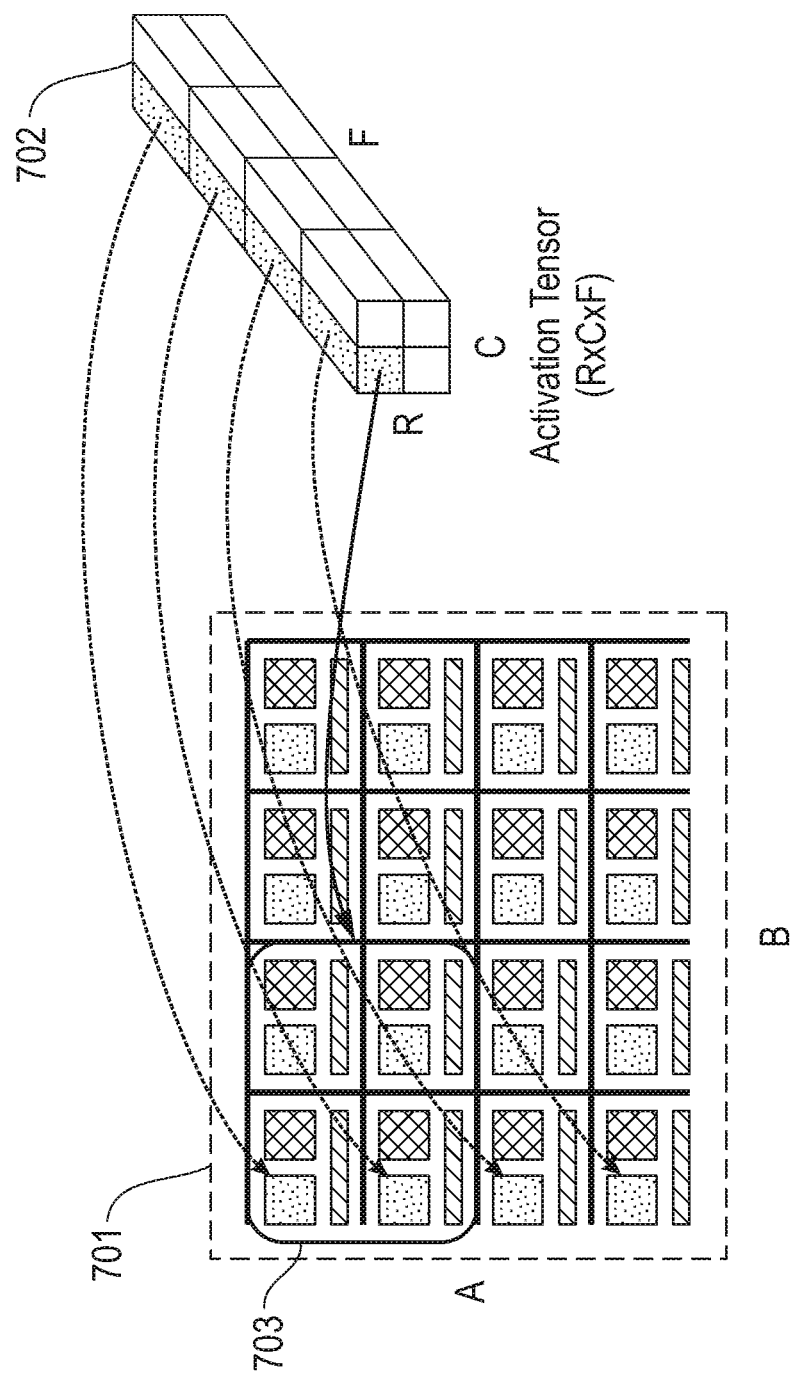
FIG. 7 illustrates another exemplary tensor mapping according to embodiments of the present disclosure.

Referring to FIG. 7, another exemplary tensor mapping is illustrated according to embodiments of the present disclosure. A parallel core array 701 includes A×B=16 parallel cores, each having vector parallelism of N. Activation tensor 702 has spatial dimensions R×C=4, and feature parallelism of F=4N. Accordingly, A>R, B>C, and N<F. Core array 701 may be partitioned into 4 islands 703, each including four cores. In this example, the islands each span a column within the array of cores. A 1×1×4N slice of the activation tensor may then be mapped to each island, each core in the island receiving a 1×1×N subslice.

Figure 8:
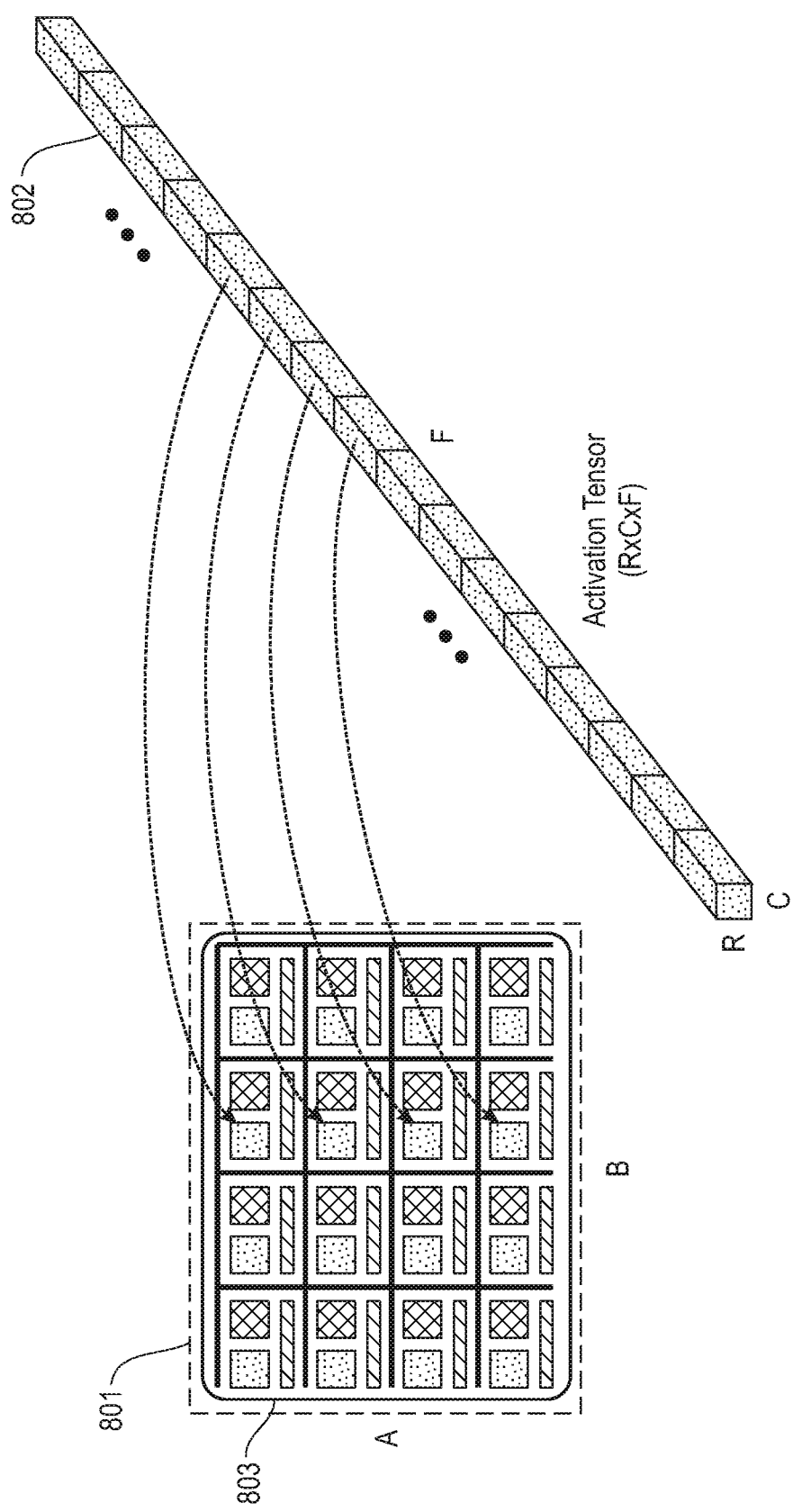
FIG. 8 illustrates another exemplary tensor mapping according to embodiments of the present disclosure.

Referring to FIG. 8, another exemplary tensor mapping is illustrated according to embodiments of the present disclosure. A parallel core array 801 includes A×B=16 parallel cores, each having vector parallelism of N. Activation tensor 802 has spatial dimensions R×C=1, and feature parallelism of F=16N. Accordingly, A>R, B>C, and N<F. Core array 801 may be partitioned into one island 803, including sixteen cores. A 1×1×1 slice of the activation tensor may then be mapped to each core in the island.

Figure 9:
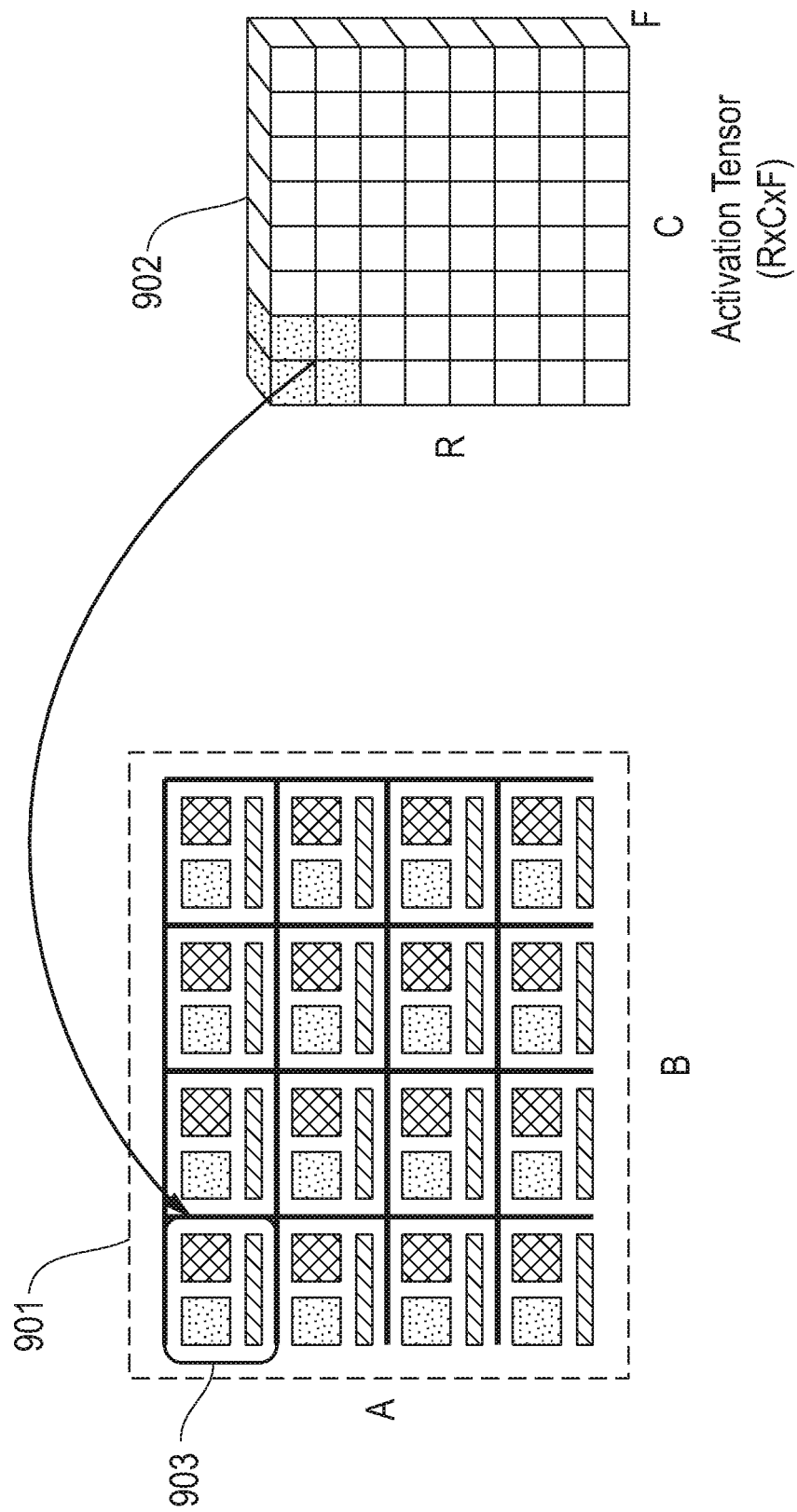
FIG. 9 illustrates another exemplary tensor mapping according to embodiments of the present disclosure.

Referring to FIG. 9, another exemplary tensor mapping is illustrated according to embodiments of the present disclosure. A parallel core array 901 includes A×B=16 parallel cores, each having vector parallelism of N. Activation tensor 902 has spatial dimensions R×C=64, and feature parallelism of F=N/4. Accordingly, 2A=R, 2B=C, and N=4F. Core array 901 may be partitioned into 16 islands 903, each including one core. A 2×2×F slice of the activation tensor may then be mapped to each island. Since the core has vector parallelism of N, the 2×2×F slice of the activation tensor may be computed in a single cycle by the core vector unit, maintaining full vector unit utilization.

It will be appreciated that the above partitions are exemplary, and other dimensions and partition schemes are within the scope of the present disclosure.

As will be appreciated from the above, different size tensors (having different spatial and feature dimensions) may be mapped to the same core array, while maintaining efficient utilization of the core array and core compute elements. In certain partitions where available spatial and feature parallelism are greater than or equal to core and vector parallelism, one island includes one core. In certain partitions where available feature parallelism is greater than vector parallelism, and available spatial parallelism is less than core parallelism, one island includes more than one core.

In certain partitions where available spatial parallelism is greater than core parallelism, and available feature parallelism is less than vector parallelism, cores are sub-divided to increase spatial parallelism, using excess feature parallelism. Sub-division is accomplished by splitting large vector units within a core into multiple smaller vector units. For example, one 64 wide vector unit can also operate as two 32 wide vector units or four 16 wide vector units. In the case of large sum trees (in a neural inference unit), the result is taken before the final level(s) of summation in the tree.

Figure 10:
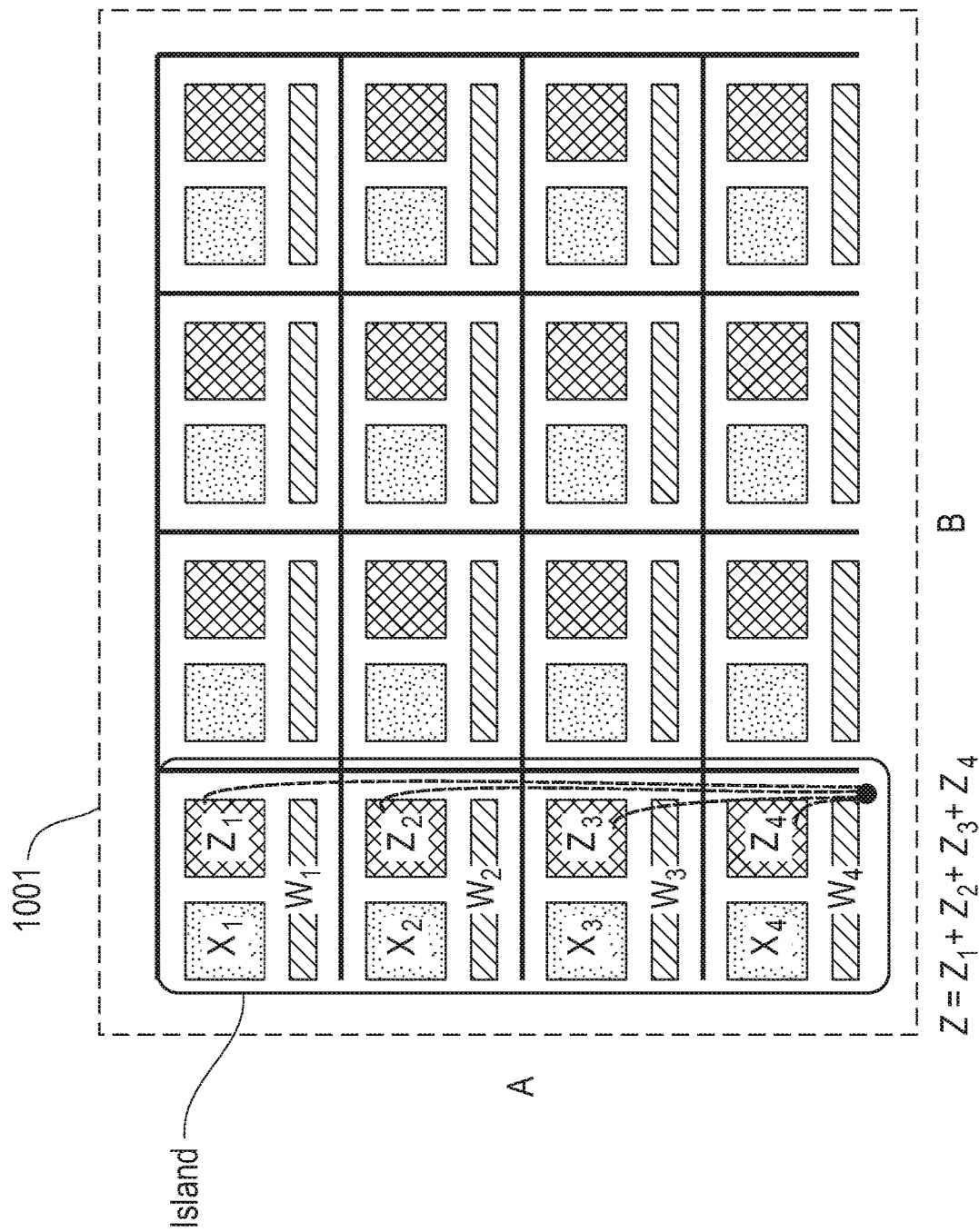
FIG. 10 illustrates partial sum passing among cores according to embodiments of the present disclosure.

Referring to FIG. 10, partial sum passing among cores is illustrated according to embodiments of the present disclosure. A parallel core array 1001 includes A×B=16 parallel cores, each having vector parallelism of N. Each island 1002 computes a vector matrix multiplication Z=XW, where X and W can be decomposed into sub-vectors and sub-matrices $X=[X_1, X_2, X_3, X_4]$ and $W=[W_1, W_2, W_3, W_4]^T$. Within the island, the cores compute partial sums $Z_1=X_1W_1$, $Z_2=X_2W_2$, $Z_3=X_3W_3$, and $Z_4=X_4W_4$. The final result is obtained by communicating the partial sums between cores within the island and summing the partial sums to arrive at a final result $Z=Z_1+Z_2+Z_3+Z_4$. In some embodiments, all partial sums are sent to a single core for final summation. In some embodiments, the partial sums are sent via a network-on-chip. By performing partial sums in this manner, the effective vector size may be configured to optimize overall efficiency.

In some embodiments, the vector-matrix sub-multiplications, partial sum communication, and partial sum accumulation are all fully pipelined. In this way, the entire island appears as one vector matrix operation.

Figure 11A:
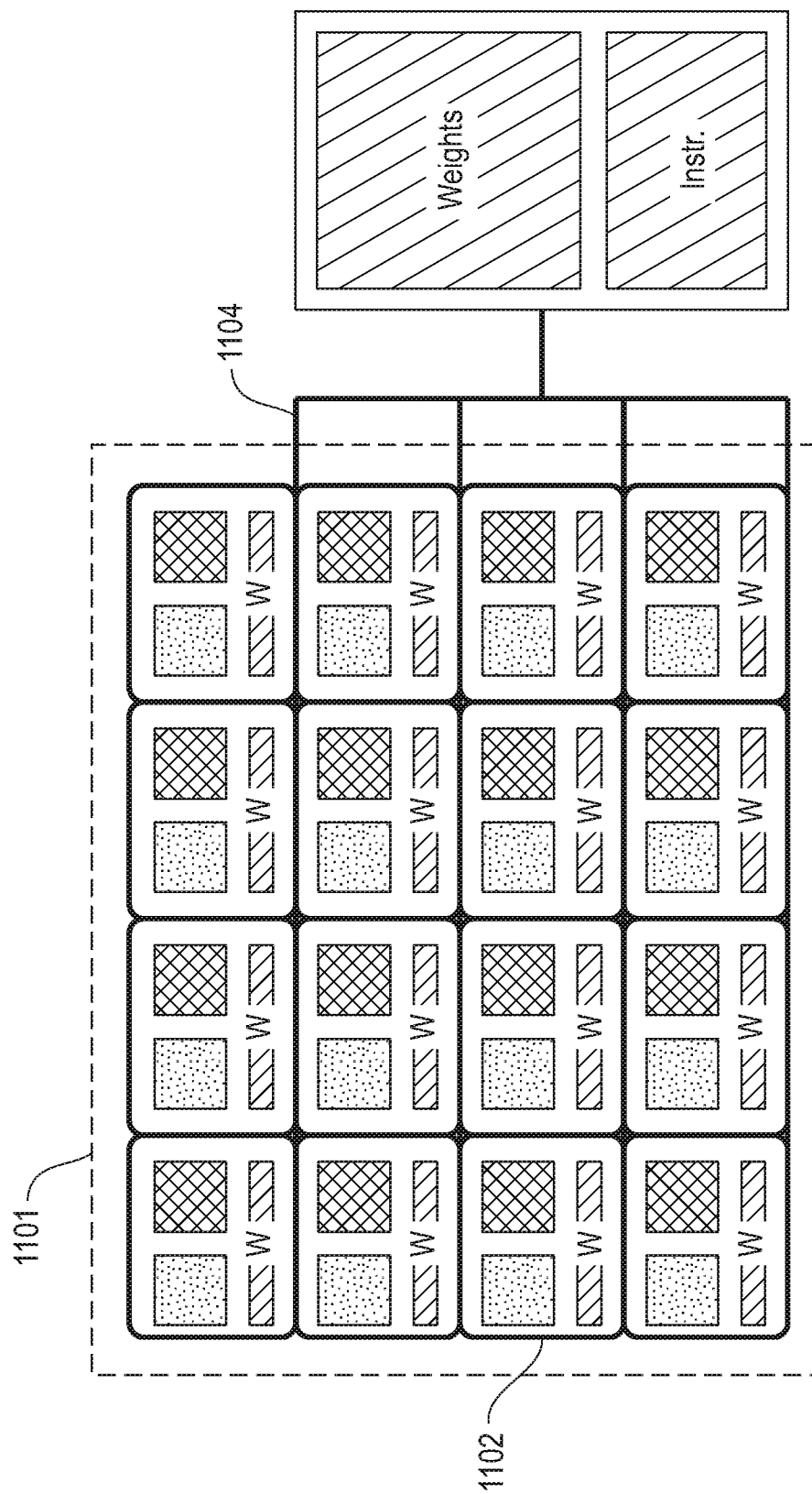
FIG. 11A-B illustrate parameter distribution according to embodiments of the present disclosure.
Figure 11B:
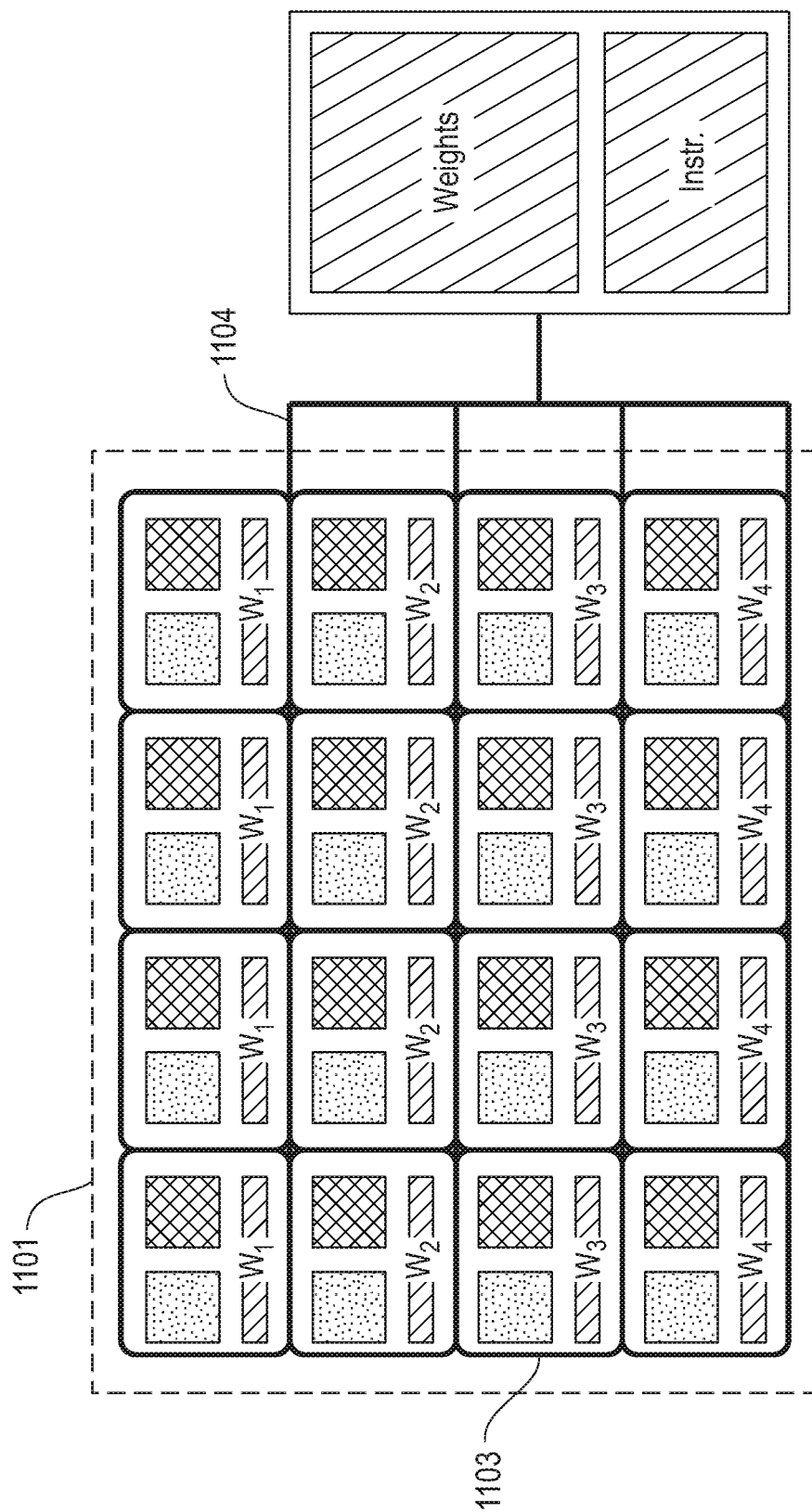

Referring to FIGS. 11A-B, parameter distribution is illustrated according to embodiments of the present disclosure. In FIG. 11A, a core array 1101 is divided into 16 islands 1102, each including one core. In FIG. 11B, core array 1101 is divided into 4 islands 1103, each including 4 cores. For these different configurations, different parameters (weights and instructions) are required at each core. In particular, in various neural networks, islands require the same parameters, while cores within an island require different parameters. NoC 1104 distributes these parameters according to the parallelism configuration, thereby allocating parallel computation across the cores.

Referring to FIG. 12, a pipelined timing diagram is provided, illustrating core operation according to embodiments of the present disclosure. At 1201, compute instructions are loaded to the neural computation unit. At 1202, parameters (including neural network weights) are loaded to the neural computation unit. At 1203, operands are loaded to the neural computation unit. At 1204, the vector-matrix multiplication is performed. At 1205, the partial sums are communicated. At 1206, the partial sums are accumulated. At 1207, the activation function is computed. At 1208, the results are stored. Each phase 1211 . . . 1214 is a different operation. Accordingly, each operation can have an independent parallelism configuration.

The instructions, which in some embodiments are distributed by the chip microengine (204), determines the operations performed by each core (arithmetic, data addressing, partial sum communication, etc.) These instructions may be passed to all cores globally, or may be passed individually to each core, with specific instructions for each core. In the latter case, each core need know only what it needs to do with its current data, the partial sums that are passed to it, and any reshuffle operations. It does not require any global knowledge of the configuration. A new instruction may be passed for each phase of operation, thus the core parallelism configuration may be changed at each phase of operation. For a pipelined core, the current parallelism configuration is kept consistent through the pipeline for each phase, enabling overlapped (pipelined) operations.

Accordingly, in various embodiments, the parallelism in the system is dynamically reconfigurable during runtime. In some embodiments, an instruction is used to reconfigure the computational architecture. In some embodiments, multiple instructions are used to reconfigure multiple portions of the computational architecture.

Figure 13:
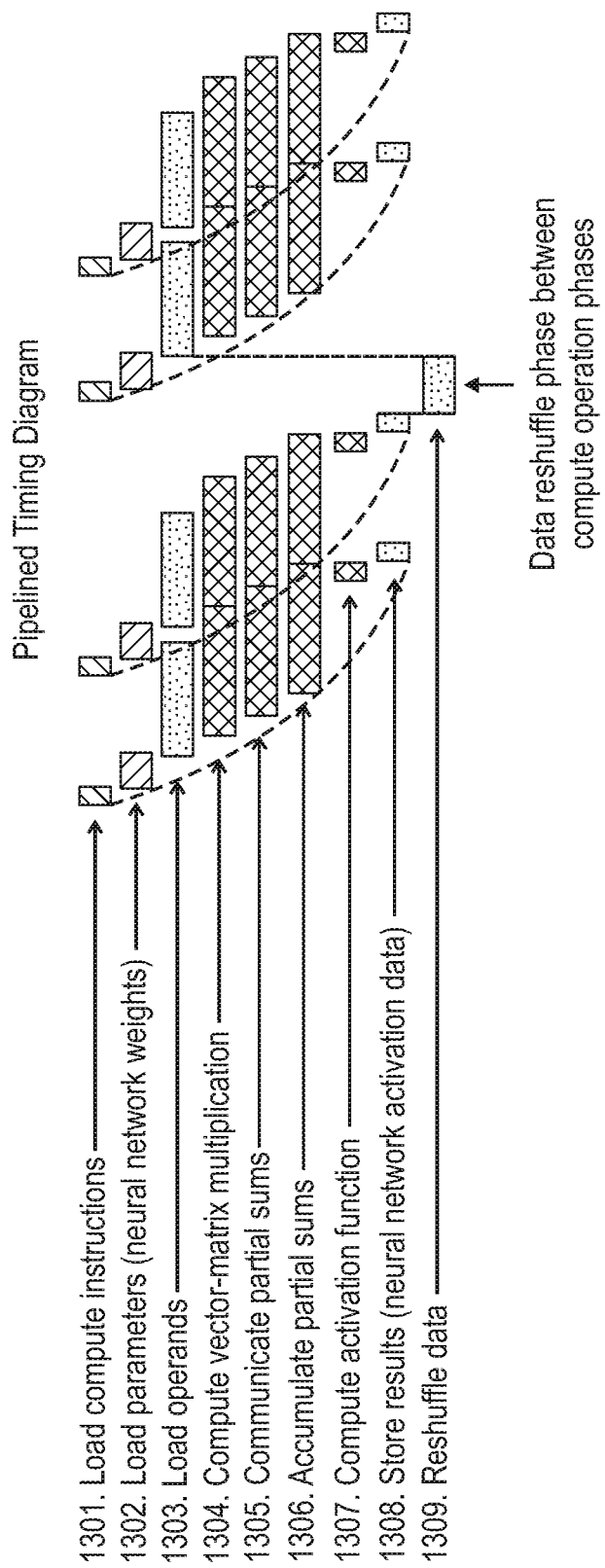
FIG. 13 is a pipelined timing diagram, illustrating data reshuffling according to embodiments of the present disclosure.

Referring to FIG. 13, a pipelined timing diagram is provided, illustrating data reshuffling according to embodiments of the present disclosure. At 1301, compute instructions are loaded to the neural computation unit. At 1302, parameters (including neural network weights) are loaded to the neural computation unit. At 1303, operands are loaded to the neural computation unit. At 1304, the vector-matrix multiplication is performed. At 1305, the partial sums are communicated. At 1306, the partial sums are accumulated. At 1307, the activation function is computed. At 1308, the results are stored. At 1309, data are reshuffled. The data reshuffle phase occurs between compute operation phases. Each phase 1211 . . . 1214 is a different operation.

If the activation data X is not in the proper core at the end of an operation, it may need to be communicated to another core, for example via the NoC. This operation may be referred to as data reshuffling, which occurs as an additional phase between compute operation phases. Reshuffling may be required when switching between parallelism configurations. In various embodiments, the data reshuffling operation is performed using core-level (core microcode) instructions. For example, such instructions may include: reading data block of length <block_length>, at address <rd_addr>, and writing data block to address <wr_addr>, on core <core_addr>.

Accordingly, data may be reshuffled for changes in the system parallelism configuration. In some embodiments, reshuffling is performed over a NoC. In some embodiments, data reshuffling is initiated via instructions.

Figure 14:
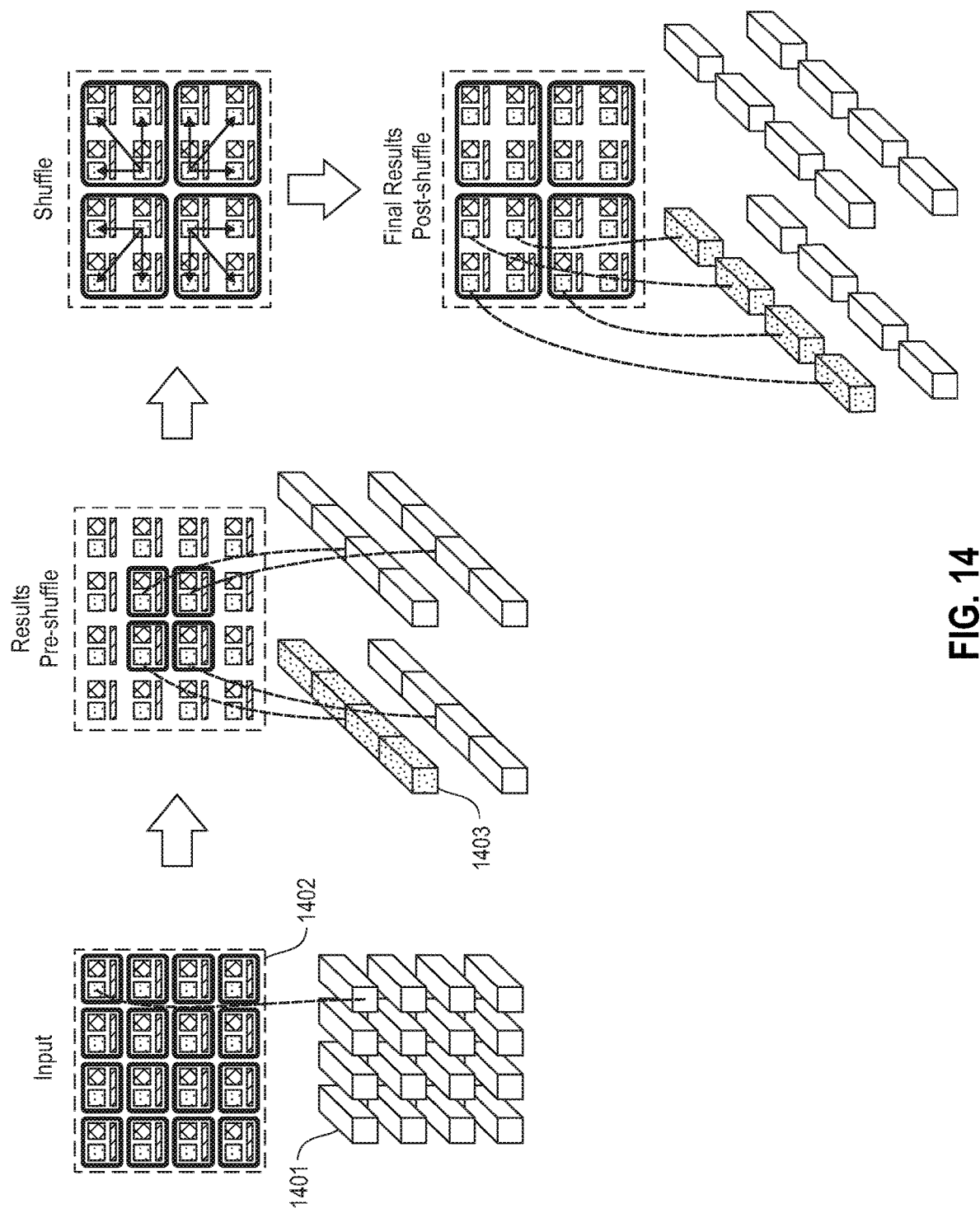
FIG. 14 illustrates a shuffle operation according to embodiments of the present disclosure.

Referring to FIG. 14, a shuffle operation is illustrated according to embodiments of the present disclosure. Input activation tensors 1401 are provided to core array 1402. Output activation results 1403 are generated. The output activation results are communicated via a NoC between cores in a shuffle phase. In some embodiments, the shuffle operation is explicit. The output activation results are thereby distributed among cores as pictured.

Figure 15:
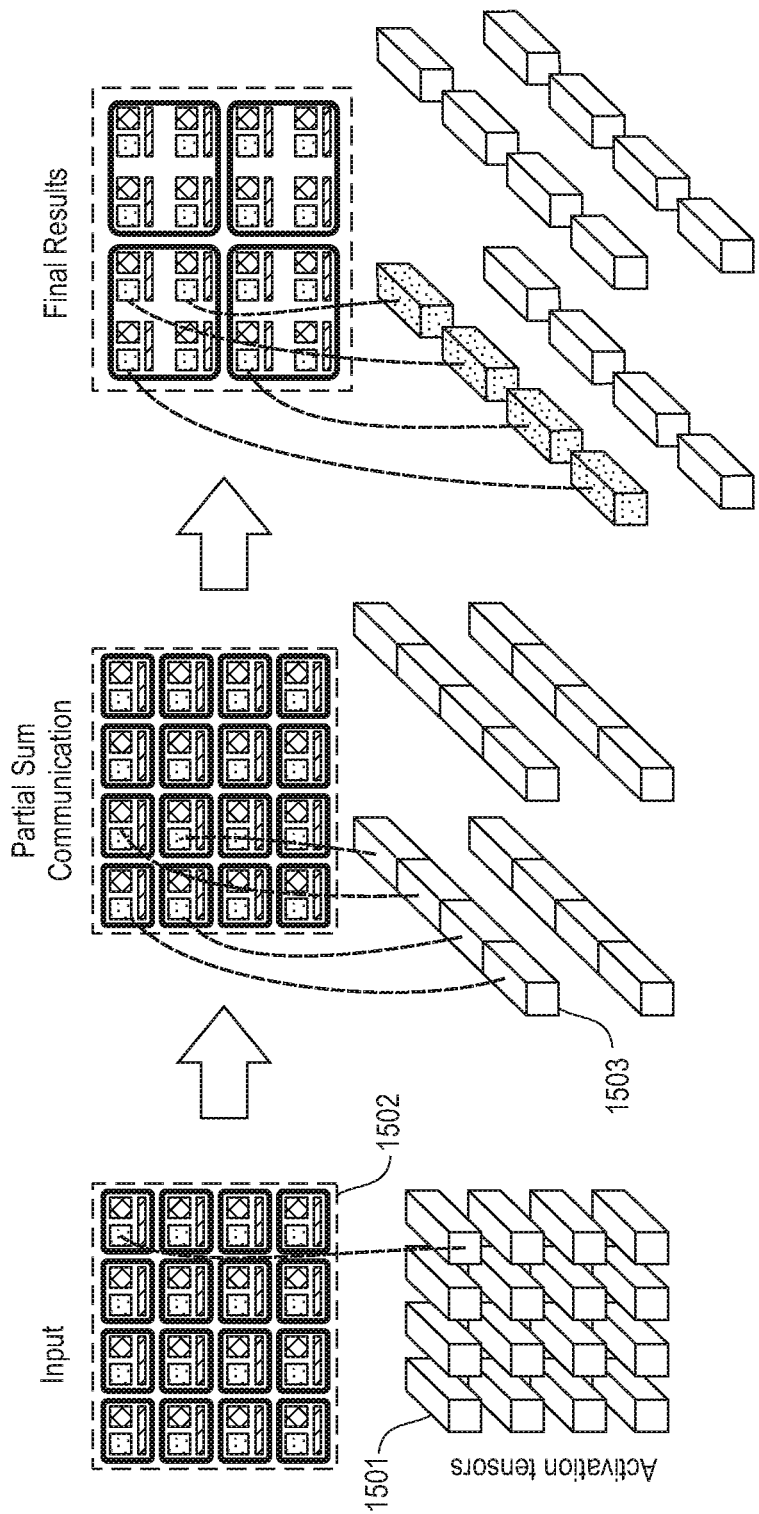
FIG. 15 illustrates another shuffle operation according to embodiments of the present disclosure.

Referring to FIG. 15, a shuffle operation is illustrated according to embodiments of the present disclosure. Input activation tensors 1501 are provided to core array 1502. Partial sums 1503 are generated and communicated. Each core within the next-layer island accumulates a different block of partial sums. In this way, the final accumulated results end up at different cores without sending output activation results via the NoC.

Figure 16:
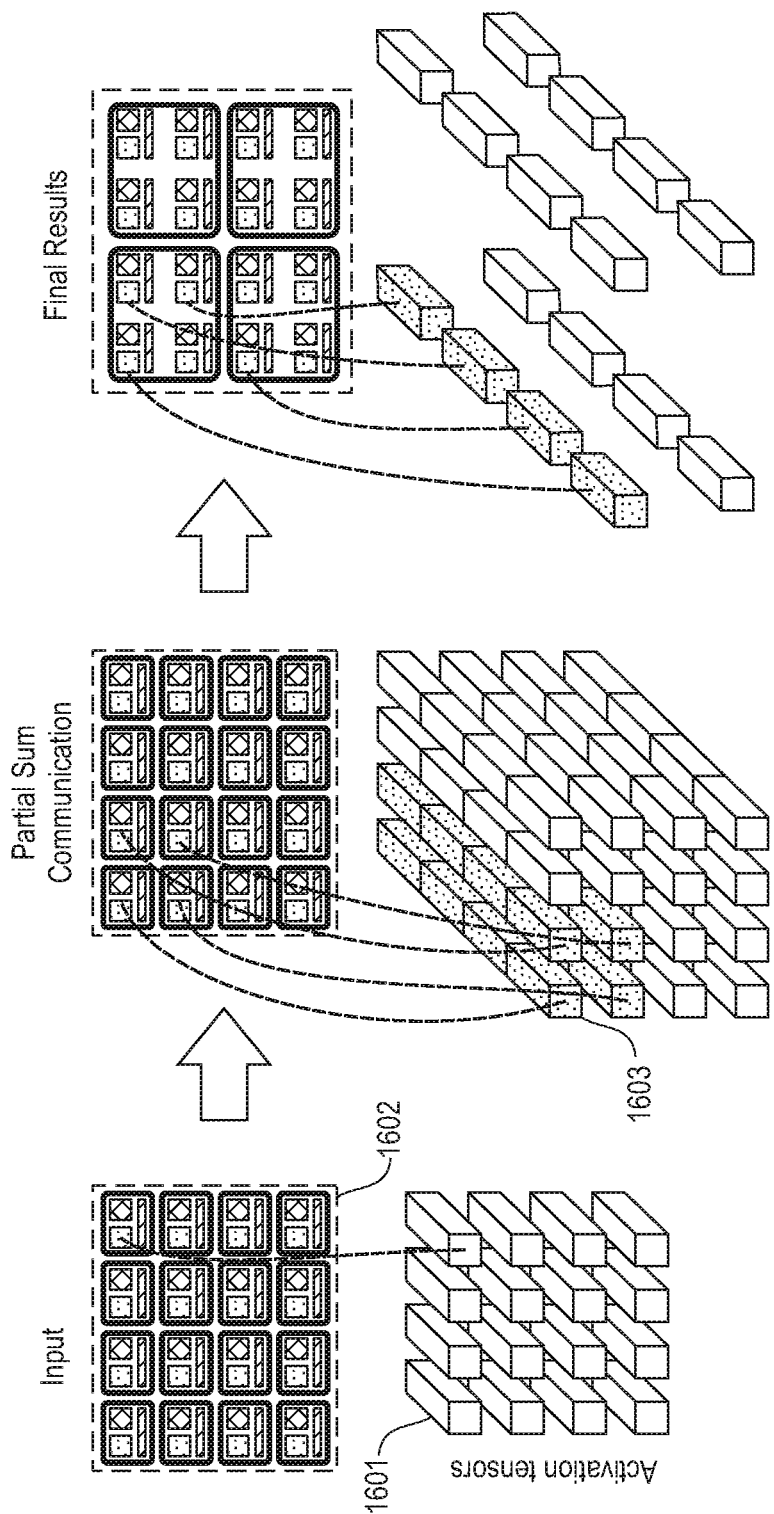
FIG. 16 illustrates another shuffle operation according to embodiments of the present disclosure.

Referring to FIG. 16, a shuffle operation is illustrated according to embodiments of the present disclosure. Input activation tensors 1601 are provided to core array 1602. Output activation results 1603 are generated. The full output tensor result is computed at each core within the next-layer island. Only the required data is operated on at the next-layer.

Figure 17:
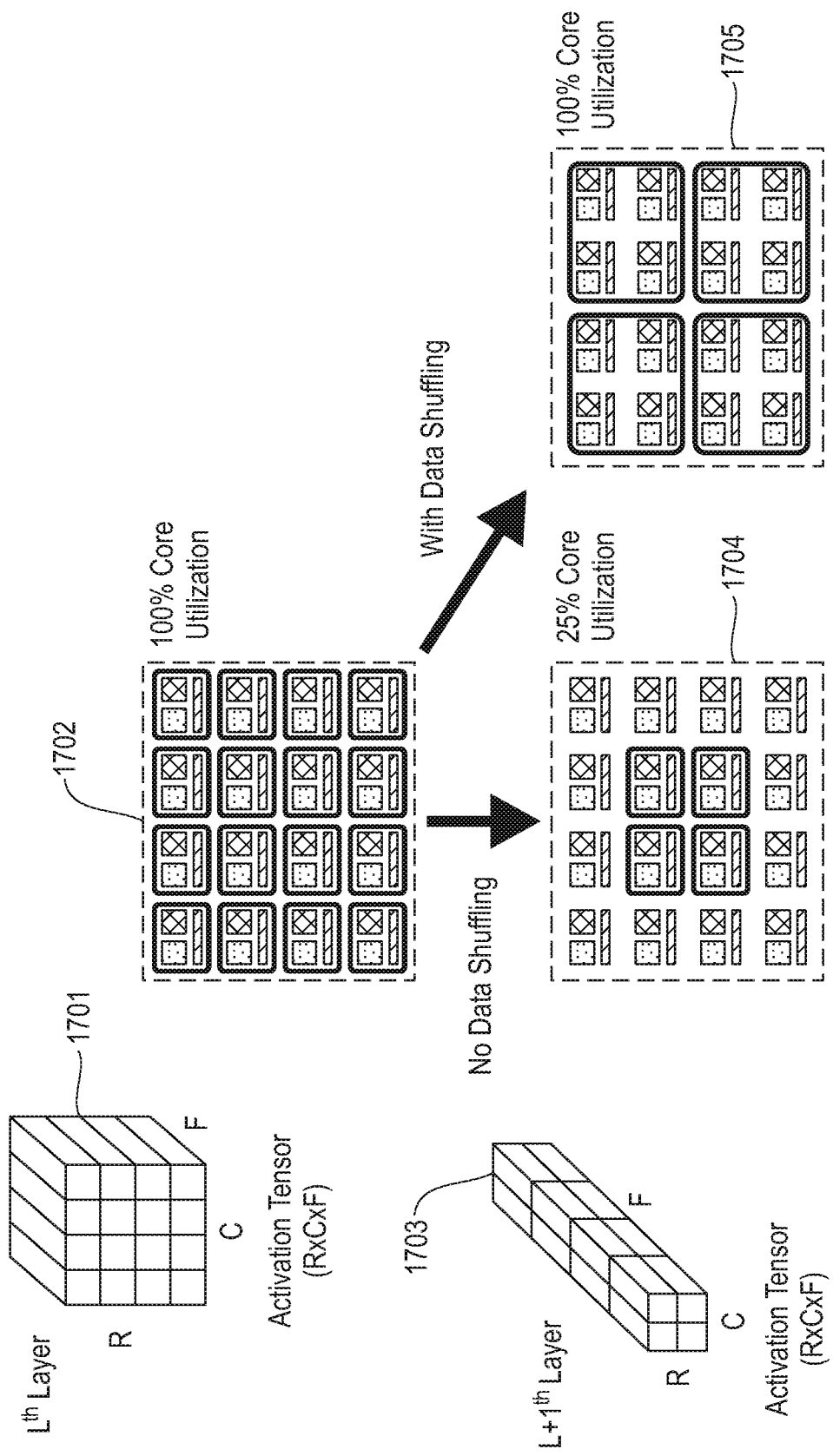
FIG. 17 illustrates reshuffling of data for parallel compute utilization according to the present disclosure.

Referring to FIG. 17, reshuffling of data for parallel compute utilization is illustrated according to the present disclosure. In an exemplary neural network, layer L has an activation tensor 1701 with dimensions $R \times C \times F = 4 \times 4 \times 1$. Core array 1702 has dimensions $A \times B = 4 \times 4$. Accordingly, tensor 1701 naturally maps onto core array 1702, configured to have $4 \times 4 = 16$ islands. Layer L+1 has an activation tensor 1703 of dimensions $R \times C \times F = 2 \times 2 \times 4$. Without data shuffling, tensor 1703 would occupy only $2 \times 2 = 4$ cores (as depicted at 1704). However, with data shuffling, the core array 1702 may be split into four islands, each including four cores. Tensor 1703 may then be mapped to the four islands, resulting in 100% core utilization (as depicted at 1705).

In the course of performing inference via different layers of a neural network, the activation data organization naturally shifts from greater spatial parallelism to greater feature parallelism. If the data is not reshuffled, the utilization of the parallel cores (number of cores computing in parallel) will fall, as the spatial parallelism falls below the core-level parallelism. By reshuffling, such that both spatial and feature parallelism can be mapped to core-level parallelism, all cores can be kept fully utilized.

Accordingly, the present disclosure provides for improving parallel core array and compute element utilization by reshuffling data between core-level and vector-level parallelism. In various embodiments, reshuffling of data is provided between spatial parallelism and feature parallelism, mapped to core-level and vector-level parallelism respectively.

Figure 18:
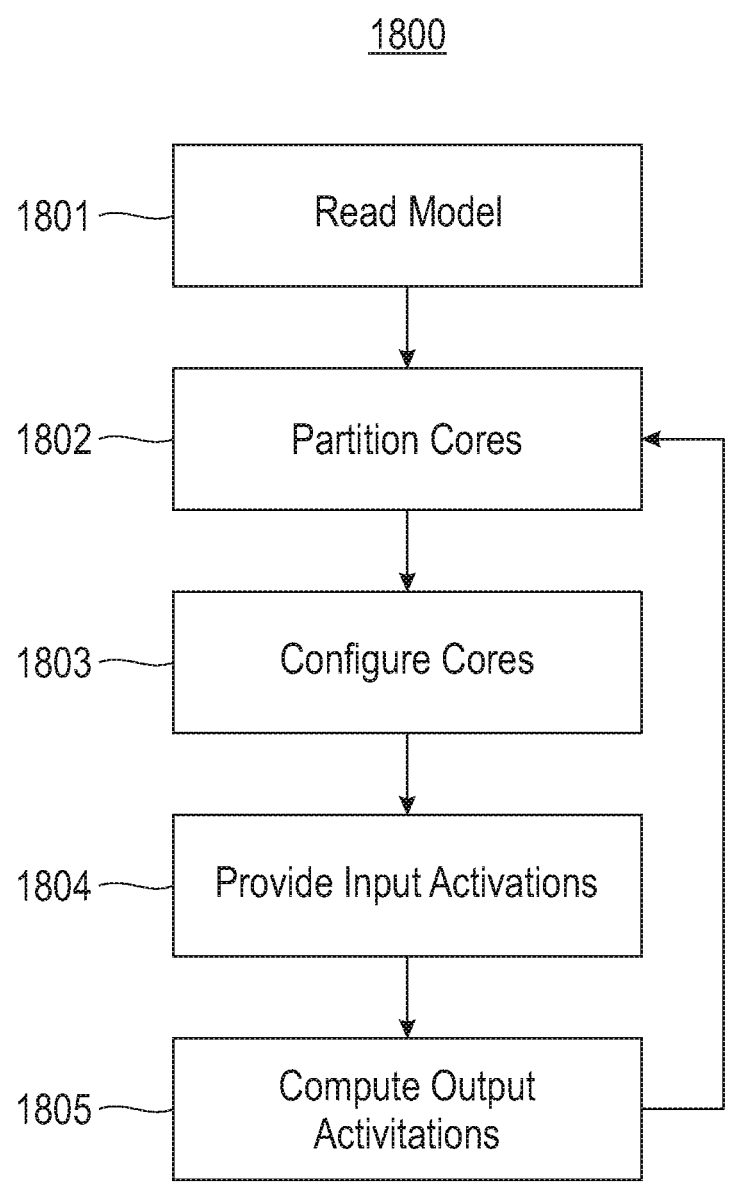
FIG. 18 illustrate a method of configuring an Inference Processing Unit (IPU) according to embodiments of the present disclosure.

Referring now to FIG. 18, a method of configuring an Inference Processing Unit (IPU) according to embodiments of the present disclosure is illustrated. At 1801, a neural network model comprising a plurality of layers is read. Each layer has at least one dimension and comprises a plurality of synaptic weights. For each layer of the neural network model: a plurality of cores is partitioned into a plurality of partitions based on dimensions of the layer and vector units at 1802; the plurality of cores is configured to implement the layer at 1803; input activations for the layer are provided to the plurality of cores at 1804; and the synaptic weights associate with the layer are applied to the input activations to produce a plurality of output activations at 1805.

Figure 19:
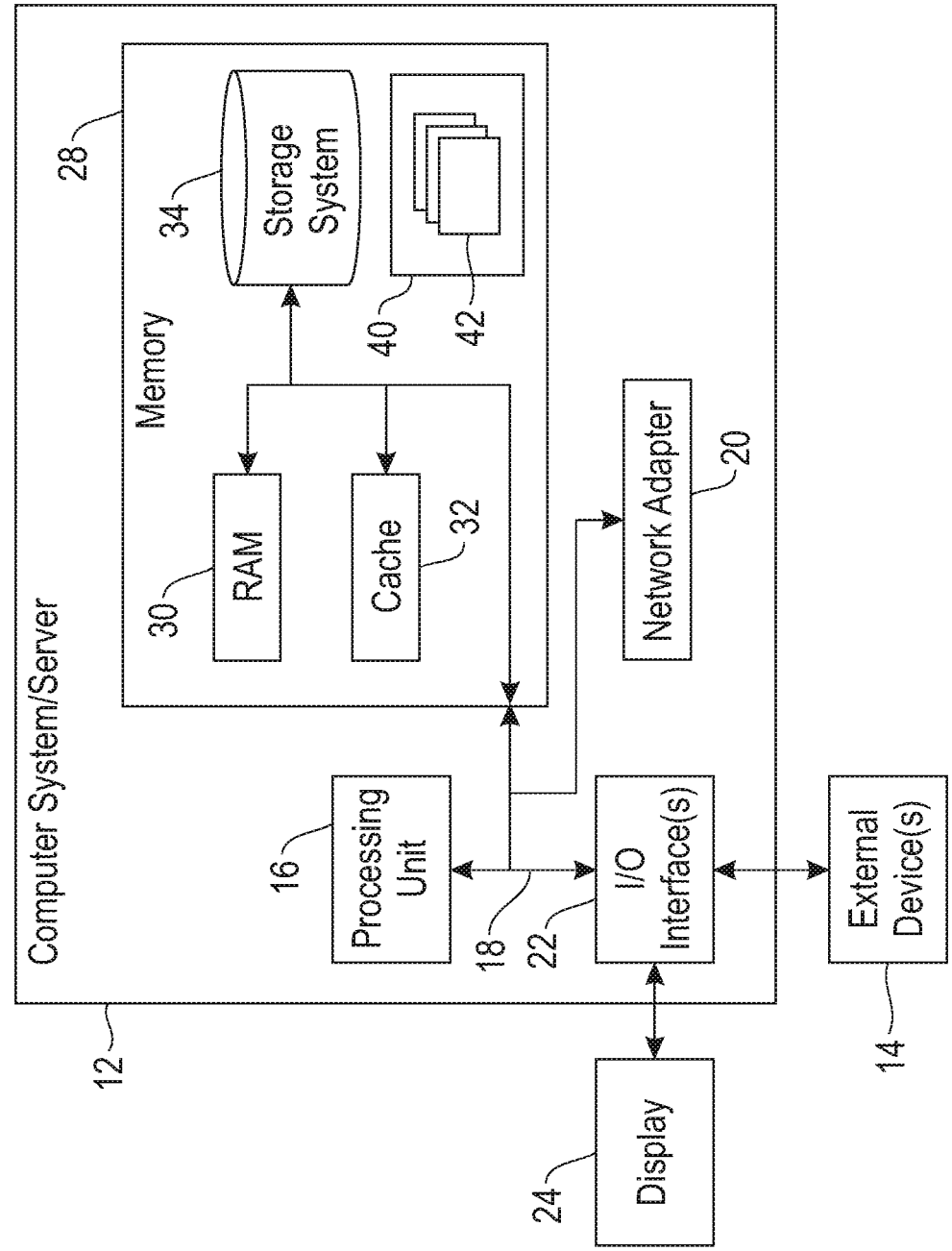
FIG. 19 depicts a computing node according to an embodiment of the present disclosure.

Referring now to FIG. 19, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 19, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In various embodiments, one or more inference processing unit (not pictured) is coupled to bus 18. In such embodiments, an IPU may receive data from or write data to memory 28 via bus 18. Likewise, an IPU may interact with other components via bus 18 as described herein.

The present disclosure may include a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a neural network model memory adapted to store a neural network model comprising a plurality of layers, each layer having at least one dimension and comprising a plurality of synaptic weights;
a plurality of neural cores, each neural core comprising
a computation unit, the computation unit adapted to apply a plurality of synaptic weights to a plurality of input activations to produce a plurality of output activations, the computation unit having a plurality of vector units, and
an activation memory adapted to store the input activations and the output activations;
wherein the system is adapted to partition the plurality of cores into a plurality of
partitions based on a comparison of at least a portion of dimensions of a layer and a quantity of the vector units, wherein the comparison includes a comparison of a size of the feature dimensions for the layer with the quantity of the vector units, and wherein partitioning the plurality of cores comprises at least one of the plurality of cores being subdivided when the size of the feature dimensions of the layer is less than the quantity of the vector units.

2. The system of claim 1, further comprising:
at least one controller operatively coupled to the neural network model memory and to the plurality of cores, the at least one controller being adapted to, for each layer of the neural network model
configure the plurality of cores to implement the layer, and
provide input activations for the layer to the plurality of cores.

3. The system of claim 2, further comprising a network on a chip (NoC) coupled to the plurality of cores.

4. The system of claim 3, wherein input activations are provided to the plurality of cores via the NoC.

5. The system of claim 3, wherein configuring the plurality of cores comprises distributing parameters to the plurality of cores via the NoC.

6. The system of claim 5, wherein configuring the plurality of cores further comprises distributing instructions to the plurality of cores via the NoC.

7. The system of claim 1, wherein the plurality of partitions for each layer is further determined based on spatial dimensions of the input activations for that layer.

8. The system of claim 1, wherein the plurality of partitions for each layer is further determined based on spatial dimensions and a size of the feature dimensions of the input activations for that layer.

9. The system of claim 1, wherein the plurality of partitions for each layer is further determined based on spatial dimensions of the output activations for that layer.

10. The system of claim 1, wherein the plurality of partitions for each layer is further determined based on spatial dimensions and feature dimensions of the output activations for that layer.

11. The system of claim 1, wherein the plurality of partitions for each layer is further determined based on one or more of spatial dimensions of the input activations, feature dimensions of the input activations, spatial dimensions of the output activations, or feature dimensions of the output activations for that layer.

12. The system of claim 11, wherein the plurality of partitions for each layer is further determined by a dimension of the plurality of cores.

13. The system of claim 1, wherein the cores within each of the plurality of partitions are configured to compute partial sums.

14. The system of claim 13, wherein the partial sums are aggregated to compute a result for an associated layer.

15. The system of claim 14, wherein the partial sums are transmitted via a network on a chip (NoC) for aggregation.

16. The system of claim 2, wherein the at least one controller is further adapted to, upon computation of output activations of a layer, redistribute the output activations among the plurality of cores.

17. The system of claim 16, wherein the redistribution is via a network.

18. The system of claim 16, wherein the redistribution is determined based on one or more of spatial dimensions of the input activations, feature dimensions of the input activations, spatial dimensions of the output activations, or feature dimensions of the output activations for that layer.

19. A method comprising:
reading a neural network model comprising a plurality of layers, each layer having at least one dimension and comprising a plurality of synaptic weights;
for each layer of the neural network model
comparing at least a portion of dimensions of a layer and a quantity of vector units, wherein the comparison includes a comparison of a size of the feature dimensions with the quantity of the vector units;
partitioning a plurality of cores into a plurality of partitions based on the comparison, wherein partitioning the plurality of cores comprises at least one of the plurality of cores being subdivided when the size of the feature dimensions of the layer is less than the quantity of the vector units,
configuring the plurality of cores to implement the layer,
providing to the plurality of cores input activations for the layer, and
applying the synaptic weights associated with the layer to the input activations to produce a plurality of output activations.

20. The method of claim 19, further comprising:
computing partial sums within each partition;
transmitting the partial sums among cores within each partition;
aggregating the partial sums to compute the output activations.

21. The method of claim 19, wherein configuring the plurality of cores comprises distributing parameters to the plurality of cores via a network.

22. The method of claim 19, wherein configuring the plurality of cores comprises distributing instructions to the plurality of cores via a network.

23. The method of claim 19, wherein the plurality of partitions for each layer is further determined based on one or more of spatial dimensions of the input activations, feature dimensions of the input activations, spatial dimensions of the output activations, or feature dimensions of the output activations for that layer.

24. The system of claim 23, wherein the plurality of partitions for each layer is further determined by a dimension of the plurality of cores.

* * * * *